US012684475B2

(12) United States Patent
Roy et al.

(10) Patent No.: US 12,684,475 B2
(45) Date of Patent: Jul. 14, 2026

(54) METHODS AND SYSTEMS FOR OPTIMIZING ACQUISITION TIME AND POWER CONSUMPTION AT A USER EQUIPMENT

(71) Applicant: Samsung Electronics Co., Ltd., Suwon-si (KR)

(72) Inventors: Koustav Roy, Bangalore (IN); Akshita Johri, Bangalore (IN); Arijit Sen, Bangalore (IN); Gaorav Kumar Gupta, Bangalore (IN); Pratibha K Satyaganapati, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/407,873

(22) Filed: Jan. 9, 2024

(65) Prior Publication Data

US 2024/0236834 A1 Jul. 11, 2024

(30) Foreign Application Priority Data

Jan. 10, 2023 (IN) ............................. 202341001922
Nov. 28, 2023 (IN) ............................. 2023 41001922

(51) Int. Cl.
*H04W 48/18* (2009.01)
*H04W 48/16* (2009.01)
*H04W 76/10* (2018.01)

(52) U.S. Cl.
CPC ........... *H04W 48/18* (2013.01); *H04W 48/16* (2013.01); *H04W 76/10* (2018.02)

(58) Field of Classification Search
CPC ...... H04W 48/16; H04W 48/18; H04W 76/10
(Continued)

(56) References Cited

U.S. PATENT DOCUMENTS

| | | | |
|---|---|---|---|
| 2019/0159101 A1* | 5/2019 | Yu ......................... | H04W 48/18 |
| 2021/0068013 A1* | 3/2021 | Cheng ................... | H04W 48/18 |

(Continued)

FOREIGN PATENT DOCUMENTS

| | | |
|---|---|---|
| EP | 3751908 A1 | 12/2020 |
| WO | 2022/155177 A1 | 7/2022 |

OTHER PUBLICATIONS

3GPP TR 38.811 V15.4.0, 3rd Generation Partnership Project; Technical Specification Group Radio Access Network; Study on New Radio (NR) to support non-terrestrial networks (Release 15), Oct. 8, 2020.

(Continued)

*Primary Examiner* — Robert J Lopata
(74) *Attorney, Agent, or Firm* — Jefferson IP Law, LLP

(57) ABSTRACT

A method and a system for optimizing acquisition time and power consumption at a user equipment (UE) are provided. The method includes establishing, by the UE located at an initial location, a radio resource control (RRC) connection with a non-terrestrial network (NTN)-based public land mobile network (PLMN), determining a current location of the UE based on one or more predetermined parameters, determining whether to perform a PLMN search for identifying a PLMN with a higher priority than connected NTN-based PLMN based at least on the initial location and the current location of the UE; and performing one of performing the PLMN search upon determining that a distance between the initial location and the current location of the UE is greater than a predetermined threshold distance value, or skipping the PLMN search upon determining that the distance between the initial location and the current location of the UE is less than the predetermined threshold distance value.

20 Claims, 23 Drawing Sheets

(58) Field of Classification Search
USPC ............................................................ 370/329
See application file for complete search history.

(56) References Cited

U.S. PATENT DOCUMENTS

| | | | | |
|---|---|---|---|---|
| 2021/0282080 | A1* | 9/2021 | Yang | H04W 60/00 |
| 2021/0368435 | A1* | 11/2021 | Koshta | H04W 60/04 |
| 2021/0410025 | A1* | 12/2021 | Dharmadhikari | H04W 8/22 |
| 2022/0232463 | A1* | 7/2022 | Sadique | H04W 48/18 |
| 2022/0232464 | A1 | 7/2022 | Matolia et al. | |
| 2022/0279390 | A1* | 9/2022 | Zhang | H04W 8/183 |
| 2023/0327753 | A1* | 10/2023 | Lin | H04B 7/18545 |
| | | | | 370/316 |
| 2024/0073785 | A1* | 2/2024 | Bhowmik | H04W 8/06 |
| 2024/0236833 | A1* | 7/2024 | Roy | H04W 84/06 |
| 2024/0251339 | A1* | 7/2024 | Kumar | H04W 8/02 |
| 2024/0267838 | A1* | 8/2024 | Roy | H04W 8/12 |
| 2024/0389051 | A1* | 11/2024 | Cogalan | H04W 60/04 |
| 2025/0159642 | A1* | 5/2025 | Hashmi | H04L 69/28 |
| 2025/0193786 | A1* | 6/2025 | Niemi | H04W 48/18 |

OTHER PUBLICATIONS

3GPP TR 38.821 V16.2.0, 3rd Generation Partnership Project; Technical Specification Group Radio Access Network; Solutions for NR to support non-terrestrial networks (NTN) (Release 16), Apr. 3, 2023.

3GPP TS 24.301 V18.4.0, 3rd Generation Partnership Project; Technical Specification Group Core Network and Terminals; Non-Access-Stratum (NAS) protocol for Evolved Packet System (EPS); Stage 3 (Release 18), Sep. 22, 2023.

3GPP TS 23.502 V18.3.0, 3rd Generation Partnership Project; Technical Specification Group Services and System Aspects; Procedures for the 5G System (5GS); Stage 2 (Release 18), Sep. 19, 2023.

3GPP TS 38.331 V17.6.0, 3rd Generation Partnership Project; Technical Specification Group Radio Access Network; NR; Radio Resource Control (RRC) protocol specification (Release 17), Sep. 28, 2023.

3GPP TS 36.331 V17.6.0, 3rd Generation Partnership Project; Technical Specification Group Radio Access Network; Evolved Universal Terrestrial Radio Access (E-UTRA); Radio Resource Control (RRC); Protocol specification (Release 17), Sep. 28, 2023.

Efficient PLMN Selection in Regenerative Non-Terrestrial Network IEEE International Conference on Electronics 2022.

* cited by examiner

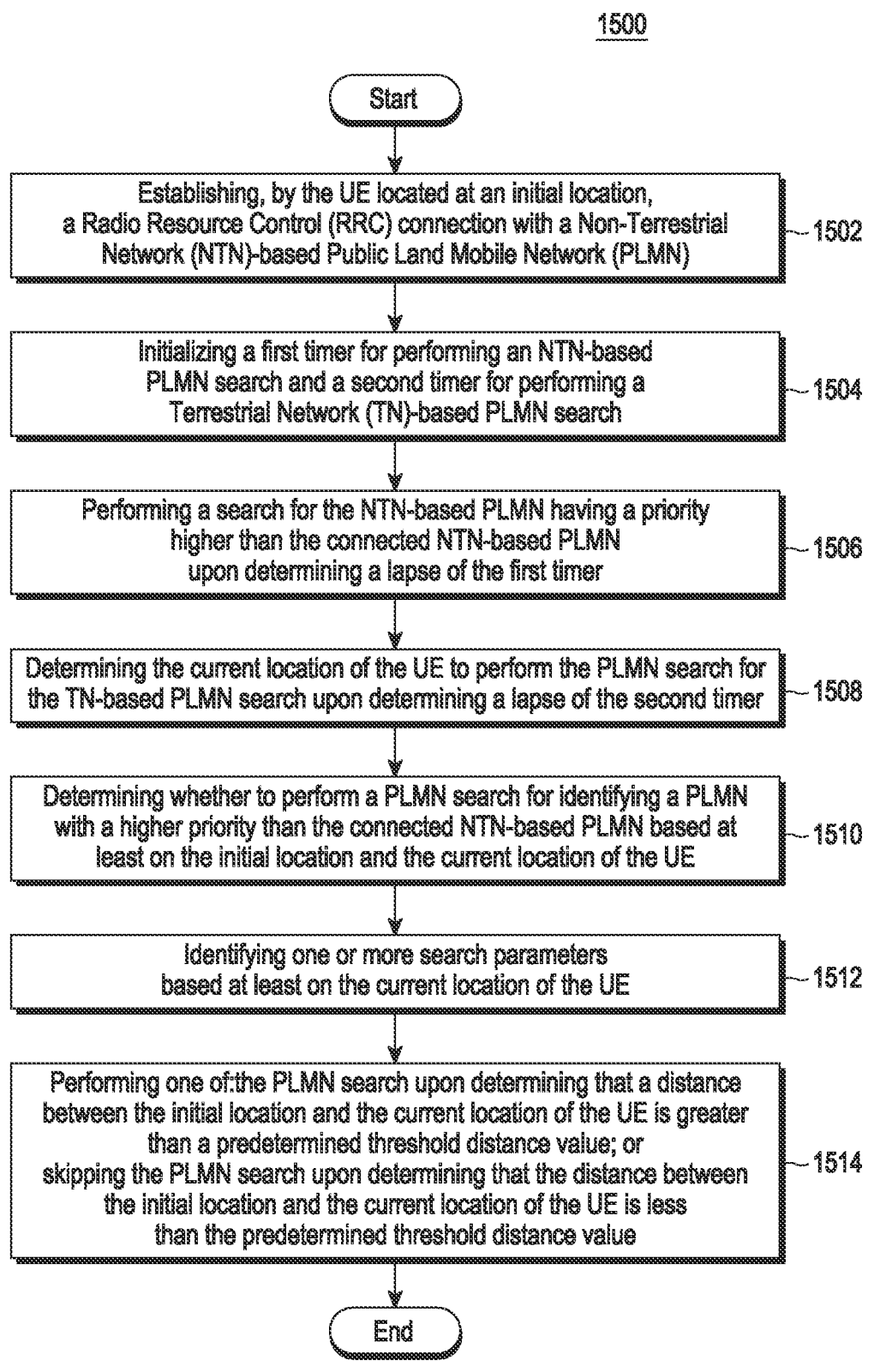

1500

Start

Establishing, by the UE located at an initial location, a Radio Resource Control (RRC) connection with a Non-Terrestrial Network (NTN)-based Public Land Mobile Network (PLMN) — 1502

Initializing a first timer for performing an NTN-based PLMN search and a second timer for performing a Terrestrial Network (TN)-based PLMN search — 1504

Performing a search for the NTN-based PLMN having a priority higher than the connected NTN-based PLMN upon determining a lapse of the first timer — 1506

Determining the current location of the UE to perform the PLMN search for the TN-based PLMN search upon determining a lapse of the second timer — 1508

Determining whether to perform a PLMN search for identifying a PLMN with a higher priority than the connected NTN-based PLMN based at least on the initial location and the current location of the UE — 1510

Identifying one or more search parameters based at least on the current location of the UE — 1512

Performing one of:the PLMN search upon determining that a distance between the initial location and the current location of the UE is greater than a predetermined threshold distance value; or skipping the PLMN search upon determining that the distance between the initial location and the current location of the UE is less than the predetermined threshold distance value — 1514

End

FIG. 15

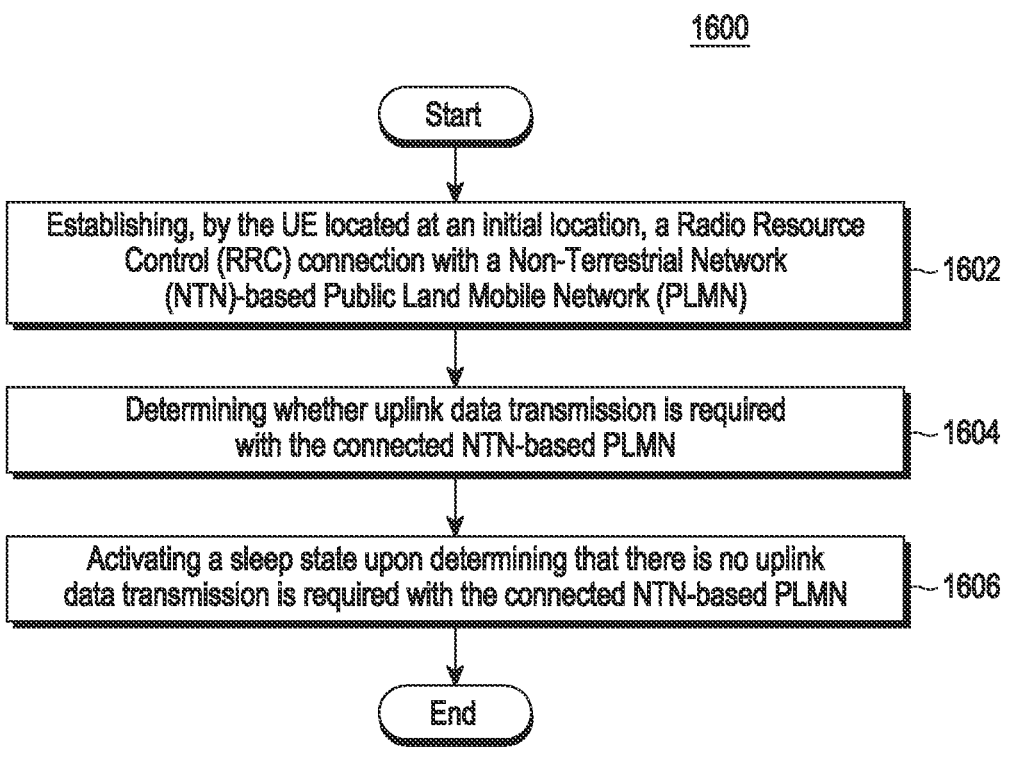

1600

Start

Establishing, by the UE located at an initial location, a Radio Resource Control (RRC) connection with a Non-Terrestrial Network (NTN)-based Public Land Mobile Network (PLMN) —1602

Determining whether uplink data transmission is required with the connected NTN-based PLMN —1604

Activating a sleep state upon determining that there is no uplink data transmission is required with the connected NTN-based PLMN —1606

End

FIG. 16

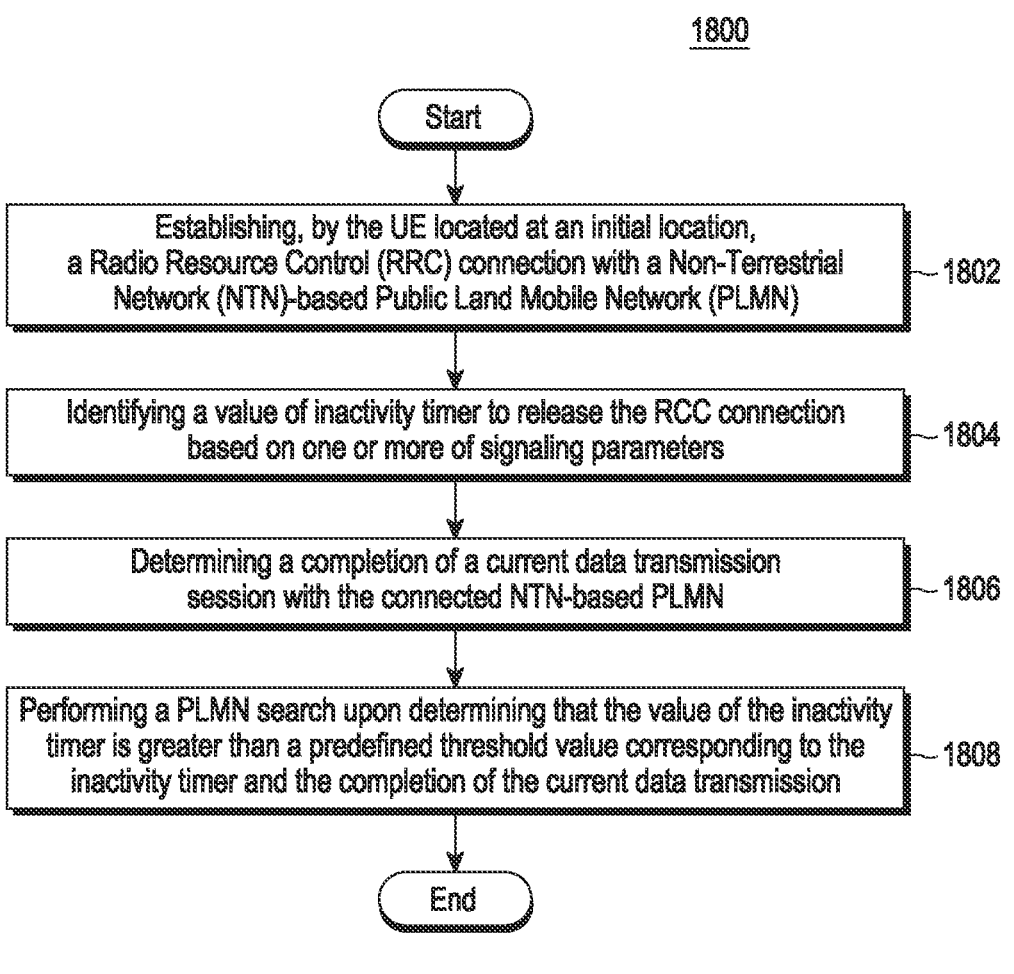

1800

Start

Establishing, by the UE located at an initial location,
a Radio Resource Control (RRC) connection with a Non-Terrestrial
Network (NTN)-based Public Land Mobile Network (PLMN) — 1802

Identifying a value of inactivity timer to release the RCC connection
based on one or more of signaling parameters — 1804

Determining a completion of a current data transmission
session with the connected NTN-based PLMN — 1806

Performing a PLMN search upon determining that the value of the inactivity
timer is greater than a predefined threshold value corresponding to the
inactivity timer and the completion of the current data transmission — 1808

End

Start

Establishing, by the UE located at an initial location,
a Radio Resource Control (RRC) connection with a
Public Land Mobile Network (PLMN) ~1902

Determining whether the connected PLMN corresponds to a
Non-Terrestrial Network (NTN) or a Terrestrial Network (TN) ~1904

Increasing a power level upon determining
that the connected PLMN corresponds to the NTN ~1906

End

2000

2100

METHODS AND SYSTEMS FOR OPTIMIZING ACQUISITION TIME AND POWER CONSUMPTION AT A USER EQUIPMENT

CROSS-REFERENCE TO RELATED APPLICATION(S)

This application is based on and claims under 35 U.S.C. § 119(a) of an Indian Provisional patent application number 202341001922, filed on Jan. 10, 2023, in the Indian Intellectual Property Office, and of an Indian Complete patent application number 202341001922, filed on Nov. 28, 2023, in the Indian Intellectual Property Office, the disclosure of each of which is incorporated by reference herein in its entirety.

BACKGROUND

1. Field

The disclosure relates to a field of wireless communication. More particularly, the disclosure relates to a method and system for optimizing terrestrial network (TN) acquisition time and user equipment (UE) power consumption while on non-terrestrial networks (NTNs).

2. Description of Related Art

In recent years, several broadband wireless technologies have been developed to meet the growing number of broadband subscribers by providing better applications and services. Second-generation (2G) wireless communication systems have been developed to provide voice services while ensuring the mobility of users. The third generation (3G) wireless communication system supports not only the voice service but also the data service. In recent years, the fourth generation (4G) wireless communication system has been developed to provide high-speed data service. However, currently, the 4G wireless communication system suffers from a lack of resources to meet the growing demand for high-speed data services. This issue is addressed by the deployment of the fifth generation (5G) wireless communication system to meet the ever-growing demand for high-speed data services. Furthermore, the 5G wireless communication system provides ultra-reliability and supports low-latency applications.

Non-terrestrial networks (NTN) are expected to foster the roll out of 4G/5G service in un-served areas that cannot be covered by terrestrial networks (e.g., isolated/remote areas, onboard aircraft, or vessels) and underserved areas (e.g., sub-urban/rural areas) to upgrade the performance of limited terrestrial networks in a cost-effective manner. The NTNs will significantly improve coverage, user bandwidth, system capacity, service reliability, service availability, energy consumption, and connection density of communication systems. The NTNs include spaceborne as well as airborne networks. The spaceborne network consists of geostationary equatorial orbit (GEO), low earth orbit (LEO), and medium earth orbit (MEO) satellites while an aerial network is based on unmanned aerial system (UAS) including high altitude platform Station (HAPS).

The terrestrial networks are utilizing the NTN coverage to provide an emergency service or all services where coverage of terrestrial networks (TNs) does not exist. For example, a ship in the middle of an ocean, a polar region, or the like. The initial phase of network deployment is to provide emergency or bare minimum service assurance where the terrestrial network coverage does not exist. As the NTN is a costly infrastructure and has worldwide coverage, the network prefers user equipment (UE) to prioritize terrestrial networks whenever available instead of the NTNs. Therefore, it is also important for the Network and the UE to get back to the TN coverage as soon as possible if the UE is already registered over the NTN.

FIGS. 1A and 1B illustrate a network environment illustrating TNs and NTNs according to the related art.

Referring to FIGS. 1A and 1B, the TN includes one or more public land mobile networks (PLMNs). Each PLMN includes a mobile switching center (MSC), a number of cell site antennas, or one or more base stations (BS). MSCs and PLMNs may communicate over a network connection which may include a physical connection or a wireless connection. In 3GPP, the NTN may include a network, such as, but is not limited to, a satellite-based cellular network, a high altitude platform station-based cellular network, or an air-to-ground-based network. The NTN may also include an unmanned aerial vehicle (UAV)-based cellular network.

With respect to NTN communication, there can be three possible ways in terms of associating public land mobile networks (PLMNs) for the TN and the NTN, which are as follows:

Case 1: Both the TN and the NTN have different PLMNs. For example, TN PLMN can be P1, and the NTN PLMN can be SX-1, as depicted in Table 1:

TABLE 1

| PLMN | TN/NTN |
|---|---|
| P1 | TN |
| SX-1 | NTN |

Case 2: Both the TN and the NTN have the same PLMN, but different band frequencies, as depicted in Table 2. For example, PLMNs for both the TN and the NTN can be P1, but for TN P1 band frequencies B1, B2, B4, and B6 can be used and for NTN P1 frequencies B3 and Bx band frequencies can be used.

TABLE 2

| PLMN | Band Frequencies | TN/NTN |
|---|---|---|
| P1 | B, B2, B4, B6 | TN |
| P1 | B3, Bx | NTN |

Case 3: Both TN and NTN have the same PLMN, as well as the same frequencies used (referred to as CASE 3). For example, PLMNs for both the TN and the NTN can be P1, and both of the PLMNs use the same set of bands B1 and B2, as depicted in Table 3.

TABLE 3

| PLMN | Band Frequencies | TN/NTN |
|---|---|---|
| P1 | B1, B2 | TN |
| P1 | B1, B2 | NTN |

If the TN and the NTN PLMNs are different, the only way to move from a lower priority PLMN to a higher priority PLMN is by performing a PLMN search after the higher priority PLMN search time has expired and the UE is in an idle state. Thus, the UE stays connected to the NTN for a longer duration than required.

The network environment 100 includes the TN and the NTN. The TN includes one or more public land mobile networks (PLMNs). Each PLMN includes a mobile switching center (MSC), mobility management entity (MME), access and mobility management function (AMF), several cell site antennas, or one or more base stations (BS). MME/AMF/MSC and base stations may communicate over a network connection which may include a physical connection or a wireless connection.

FIGS. 2A and 2B illustrate an issue of a UE getting stuck at an NTN for a longer duration according to the related art.

Referring to FIG. 2A, it illustrates a flow diagram depicting the issue of the UE getting stuck at the NTN for a longer duration. In the illustrated scenario, the following assumptions are made:

PLMN-X is an NTN PLMN; and

PLMN-1 is a TN PLMN.

Further, the NTN PLMN is considered a lower priority PLMN compared to the TN PLMN.

Block 202 represents that the UE is currently camped on the PLMN-X. Further, the UE starts a higher-priority PLMN (HPLMN) search timer T, if the HPLMN Search timer T is not running or has expired. At operation 204, the UE determines that if the HPLMN timer T is expired or not. If the HPLMN timer T has not expired, then the UE stays camped on the PLMN-X. However, upon determining that the HPLMN timer T has expired, the UE performs operations at block 206. Specifically, at block 206, the UE searches for the TN PLMN (e.g., the PLMN-1) or a higher-priority PLMN. At block 207, the UE determines if the higher priority PLMN is available. Upon determining that the higher priority PLMN is not available, the UE performs operations defined at block 208. Specifically, at block 208, the UE increases the HPLMN timer value T and reinitiates the operations from block 202. For instance, if the current HPLMN timer T is 6 minutes, and after the expiry of 6 minutes of the HPLMN timer T, the UE does not find any suitable higher priority PLMN, the UE may increase the HPLMN timer T in the next iteration i.e., the next HPLMN timer will start with a value of 30 minutes.

However, if the UE finds a suitable higher-priority PLMN at block 207, then after block 208, the UE performs operations at block 210. Specifically, at block 210, the UE registers over the higher priority PLMN. For example, the PLMN-1.

In case the HPLMN timer is too high then acquiring service over the TN PLMN will take longer time, i.e., the UE might not be able to connect to the TN PLMN even though the TN PLMN is available as shown in FIG. 2B.

FIGS. 3A and 3B illustrate an issue of high power consumption by a UE to connect to a TN according to the related art.

Referring to FIG. 3A, it illustrates a flow diagram depicting an issue of high power consumption by the UE to connect to the TN. In the illustrated scenario, the following assumptions are made:

PLMN-X is an NTN PLMN;

PLMN-1 is a TN PLMN;

The HPLMN search is configured with a very low value.

While the operations performed by the UE at the blocks 302-310 are similar to corresponding blocks 202-210, as explained in reference to FIG. 2A, the UE may perform the HPLMN search more frequently as compared to FIG. 2A due to the low value of HPLMN search timer. As, the UE is not configured to change the value of the HPLMN search timer if no higher priority PLMN is available, as previously performed at block 207, the UE will keep on searching for the higher priority PLMN based on the same preconfigured HPLMN timer. The frequent searching for the higher priority PLMN may result in high power consumption leading to very fast depletion of battery power of the UE, as shown in FIG. 3B.

FIG. 4 illustrates an issue of transmission delay at a UE according to the related art. FIG. 4 has been explained as a sequence of operations performed by the UE, an NTN PLMN, and a TN PLMN.

Referring to FIG. 4, operation 401 indicates that the UE is connected with the NTN PLMN with a radio resource control (RRC) connection and a current session is over, i.e., uplink and downlink data transfer is ended.

At operation 402, the NTN PLMN will initiate an inactivity timer. However, in case the inactivity timer is configured with a very high value, the UE may remain connected to the NTN PLMN for a longer period than required. More particularly, the UE may be stuck with the NTN PLMN for a longer period of time resulting in a wastage of resources and power required to maintain the connection with the NTN PLMN.

At operation 403, the NTN PLMN may release the RRC connection upon expiration of the inactivity timer. At operation 404, the UE may initiate the HPLMN search timer to perform the HPLM search. At operation 405, the UE may perform the HPLMN search upon expiration of the HPLMN timer. At operation 406, the UE identifies the TN PLMN in the HPLMN search and camps on the TN PLMN, as the TN PLMN may be considered a higher-priority PLMN as compared to the NTN PLMN. At operation 407, the UE is connected to the TN PLMN.

Therefore, even though a higher-priority PLMN i.e., the TN PLMN was available for the UE, the UE had to remain connected to the NTN PLMN resulting in additional resource and power utilization, and thereby degrading the user experience with the network.

Thus, there is a need to overcome the above-mentioned problems in the wireless communication network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for optimizing terrestrial network acquisition time and UE power consumption while on NTNs.

Additional aspects will be set forth in part in the description which follows and, in part, will be apparent from the description, or may be learned by practice of the presented embodiments.

In accordance with an aspect of the disclosure, a method for power management at a user equipment (UE) is provided. The method includes establishing, by the UE located at an initial location, a radio resource control (RRC) connection with a non-terrestrial network (NTN)-based public land mobile network (PLMN), determining a current location of the UE based on one or more predetermined parameters, determining whether to perform a PLMN search for identifying a PLMN with a higher priority than connected NTN-based PLMN based at least on the initial location and the current location of the UE, and performing one of the PLMN search upon determining that a distance between the initial location and the current location of the UE is greater than a predetermined threshold distance value, or skipping the PLMN search upon determining that the distance between the initial location and the current location of the UE is less than the predetermined threshold distance value.

In accordance with another aspect of the disclosure, a method for power management at a UE is provided. The method includes establishing, by the UE located at an initial location, an RRC connection with an NTN-based PLMN, determining whether uplink data transmission is required with connected NTN-based PLMN, and activating a sleep state upon determining that there is no uplink data transmission is required with the connected NTN-based PLMN.

In accordance with another aspect of the disclosure, a method for power management of a UE by a network is provided. The method includes establishing an RRC connection with an NTN-based PLMN corresponding to the network, initializing a predefined PLMN search timer to perform the PLMN search, where a predefined PLMN search timer defines a duration the UE needs to wait before performing a PLMN search, determining a location of the UE based on one or more predetermined parameters, determining an availability of a terrestrial network (TN) or a higher priority NTN-based PLMN at the location of the UE, and modifying the predefined PLMN search timer based at least on the availability of the TN-based PLMN.

In accordance with another aspect of the disclosure, a method for power management at a UE is provided. The method includes establishing, by the UE located at an initial location, an RRC connection with an NTN-based PLMN, identifying a value of the inactivity timer to release the RCC connection based on one or more signaling parameters, determining a completion of a current data transmission session with connected NTN-based PLMN, and performing a PLMN search upon determining that the value of the inactivity timer is greater than a predefined threshold value corresponding to the inactivity timer and the completion of the current data transmission.

In accordance with another aspect of the disclosure, a method for power management at a UE is provided. The method includes establishing, by the UE located at an initial location, an RRC connection with a PLMN, determining whether connected PLMN corresponds to an NTN or an TN, and increasing a power level upon determining that the connected PLMN corresponds to the NTN.

In accordance with another aspect of the disclosure, a system for power management at a UE is provided. The system includes one or more processors, and memory storing one or more computer programs including computer-executable instructions that, when executed by the one or more processors, cause the system to establish, by the UE located at an initial location, an RRC connection with an NTN-based PLMN, determine a current location of the UE based on one or more predetermined parameters, determine whether to perform a PLMN search for identifying a PLMN with a higher priority than connected NTN-based PLMN based at least on the initial location and the current location of the UE, and perform one of the PLMN search upon determining that a distance between the initial location and the current location of the UE is greater than a predetermined threshold distance value, or skip the PLMN search upon determining that the distance between the initial location and the current location of the UE is less than the predetermined threshold distance value.

In accordance with another aspect of the disclosure, a system for power management at a UE is provided. The system includes one or more processors, and memory storing one or more computer programs including computer-executable instructions that, when executed by the one or more processors, cause the system to establish, by the UE located at an initial location, an RRC connection with an NTN-based PLMN, determine whether uplink data transmission is required with connected NTN-based PLMN, and activate a sleep state upon determining that there is no uplink data transmission required with the connected NTN-based PLMN.

In accordance with another aspect of the disclosure, a system for power management at a UE is provided. The system includes one or more processors, and memory storing one or more computer programs including computer-executable instructions that, when executed by the one or more processors, cause the system to establish an RRC connection with an NTN-based PLMN corresponding to the network, initialize a predefined PLMN search timer to perform the PLMN search, where a predefined PLMN search timer defines a duration the UE needs to wait before performing a PLMN search, determine a location of the UE based on one or more predetermined parameters, initialize determining an availability of an TN or a higher priority NTN-based PLMN at the location of the UE, and modify the predefined PLMN search timer based at least on the availability of the TN-Based PLMN.

In accordance with another aspect of the disclosure, a system for power management at a UE is provided. The system includes one or more processors, and memory storing one or more computer programs including computer-executable instructions that, when executed by the one or more processors, cause the system to establish, by the UE located at an initial location, an RRC connection with an NTN-based PLMN, identify a value of inactivity timer to release the RCC connection based on one or more of signaling parameters, determine a completion of a current data transmission session with connected NTN-based PLMN and perform a PLMN search upon determining that the value of the inactivity timer is greater than a predefined threshold value corresponding to the inactivity timer and the completion of the current data transmission.

In accordance with another aspect of the disclosure, a system for power management at a UE is provided. The system includes one or more processors, and memory storing one or more computer programs including computer-executable instructions that, when executed by the one or more processors, cause the system to establish, by the UE located at an initial location, an RRC connection with a PLMN, determine whether connected PLMN corresponds to an NTN or an TN, and increase a power level upon determining that the connected PLMN corresponds to the NTN.

In accordance with another aspect of the disclosure, one or more non-transitory computer-readable storage media storing computer-executable instructions that, when executed by one or more processors of a system for power management at a user equipment (UE), cause the system to perform operations are provided. The operations include establishing, by the UE located at an initial location, a radio resource control (RRC) connection with a non-terrestrial network (NTN)-based public land mobile network (PLMN), determining a current location of the UE based on one or more predetermined parameters, determining whether to perform a PLMN search for identifying a PLMN with a higher priority than connected NTN-based PLMN based at least on the initial location and the current location of the UE, and performing one of performing the PLMN search upon determining that a distance between the initial location and the current location of the UE is greater than a predetermined threshold distance value, or skipping the PLMN search upon determining that the distance between the initial location and the current location of the UE is less than the predetermined threshold distance value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 illustrates a process flow depicting a method for power management at a UE according to an embodiment of the disclosure;

FIG. 16 illustrates a process flow depicting a method for power management at a UE according to an embodiment of the disclosure;

FIG. 18 illustrates a process flow depicting a method for power management at a UE according to an embodiment of the disclosure;

The same reference numerals are used to represent the same elements throughout the drawings.

DETAILED DESCRIPTION

Figure 1A:
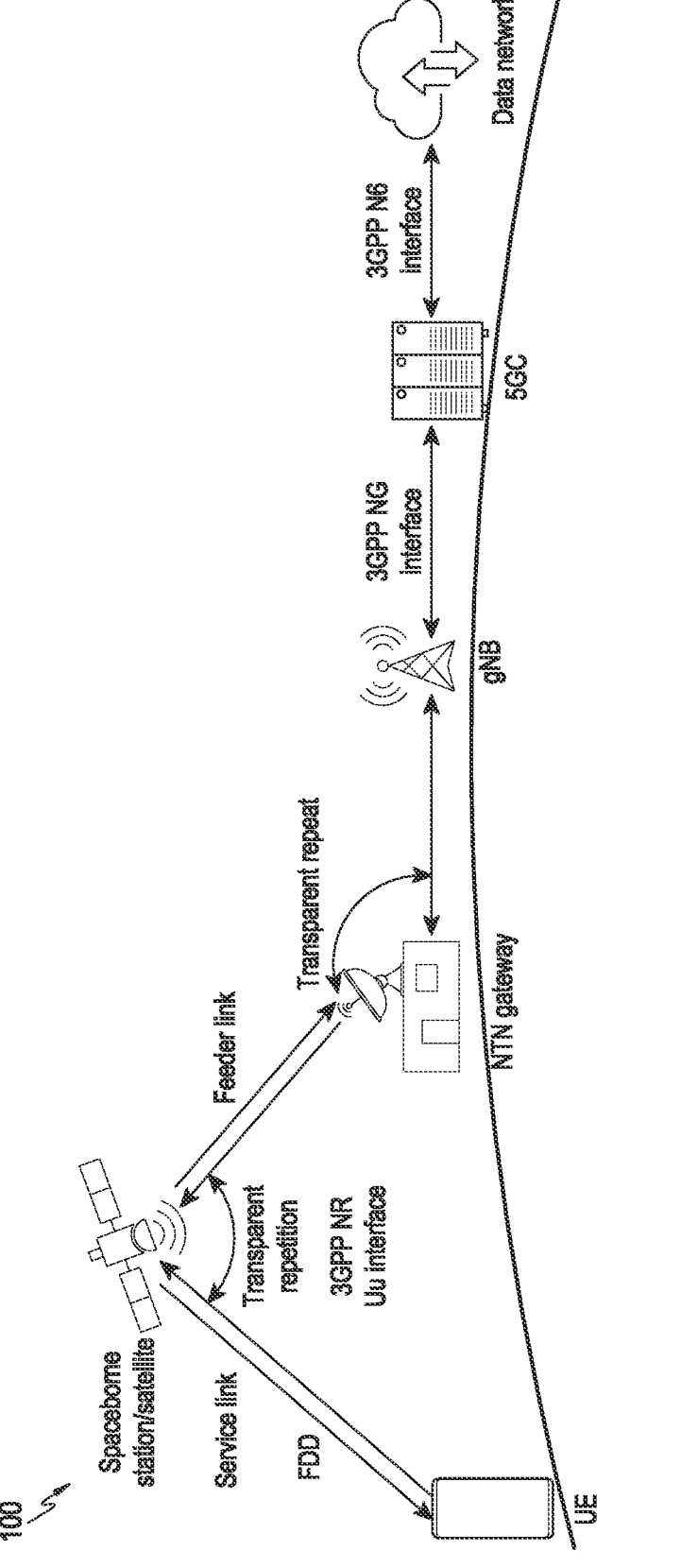
FIGS. 1A and 1B illustrate a network environment illustrating a terrestrial network (TN) and a non-terrestrial network (NTN) according to the related art.
Figure 1B:
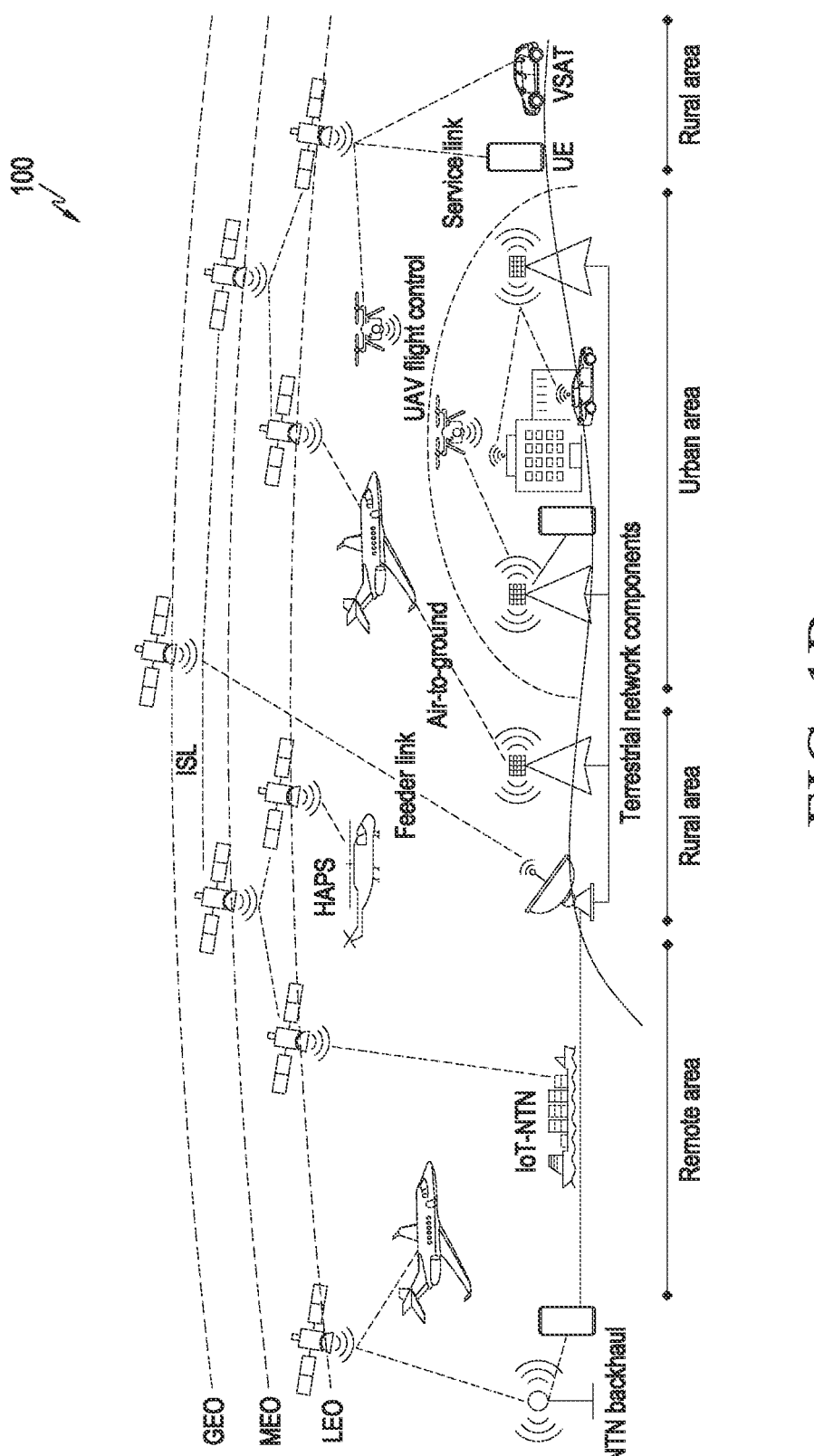
Figure 2A:
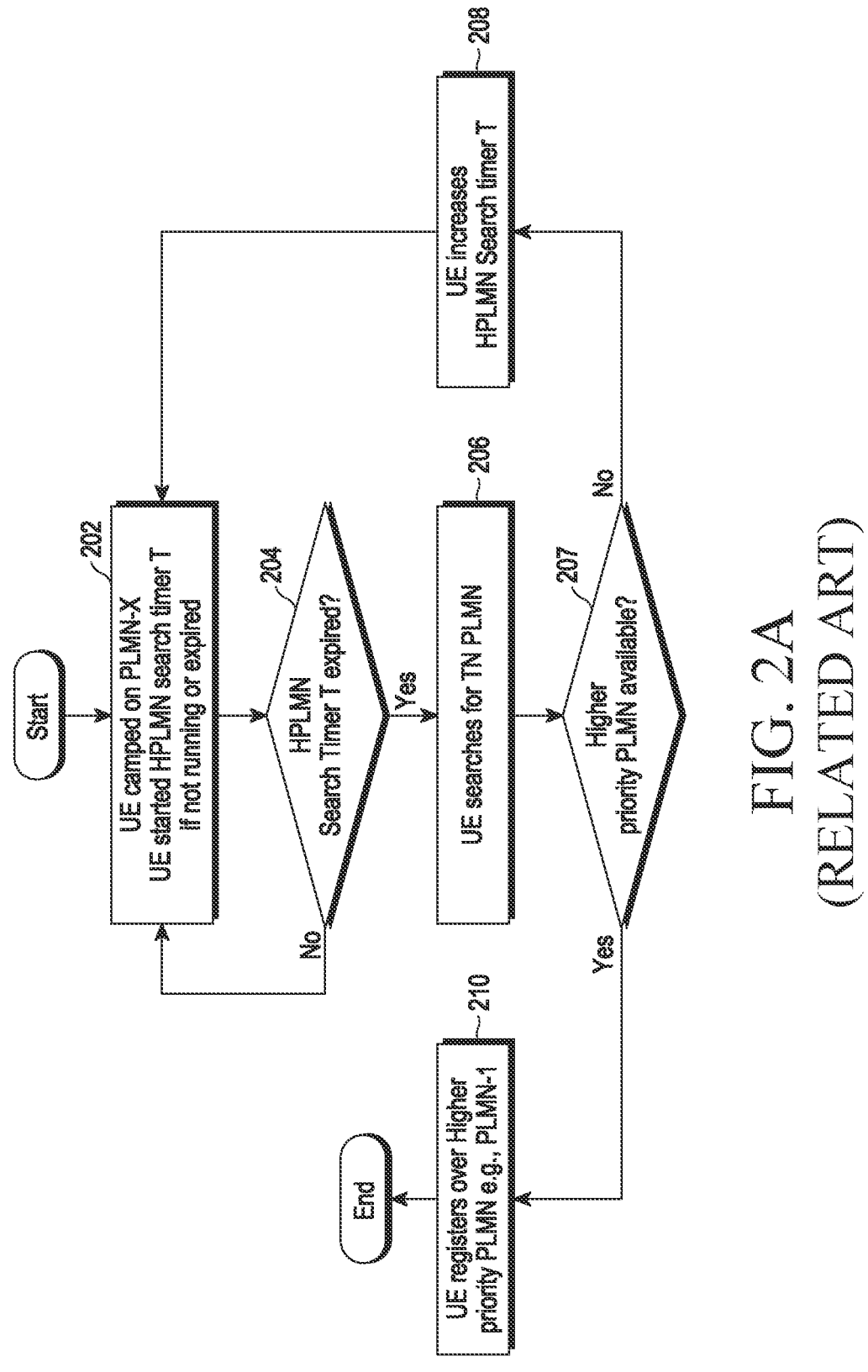
FIGS. 2A and 2B illustrate an issue of a user equipment (UE) getting stuck at the NTN for a longer duration according to the related art.
Figure 2B:
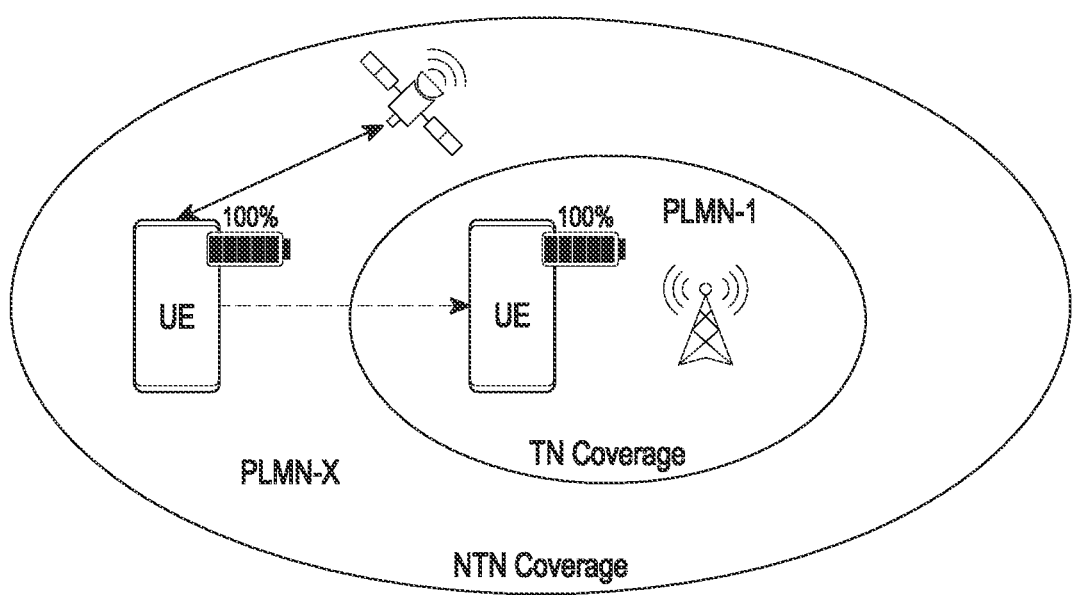
Figure 3A:
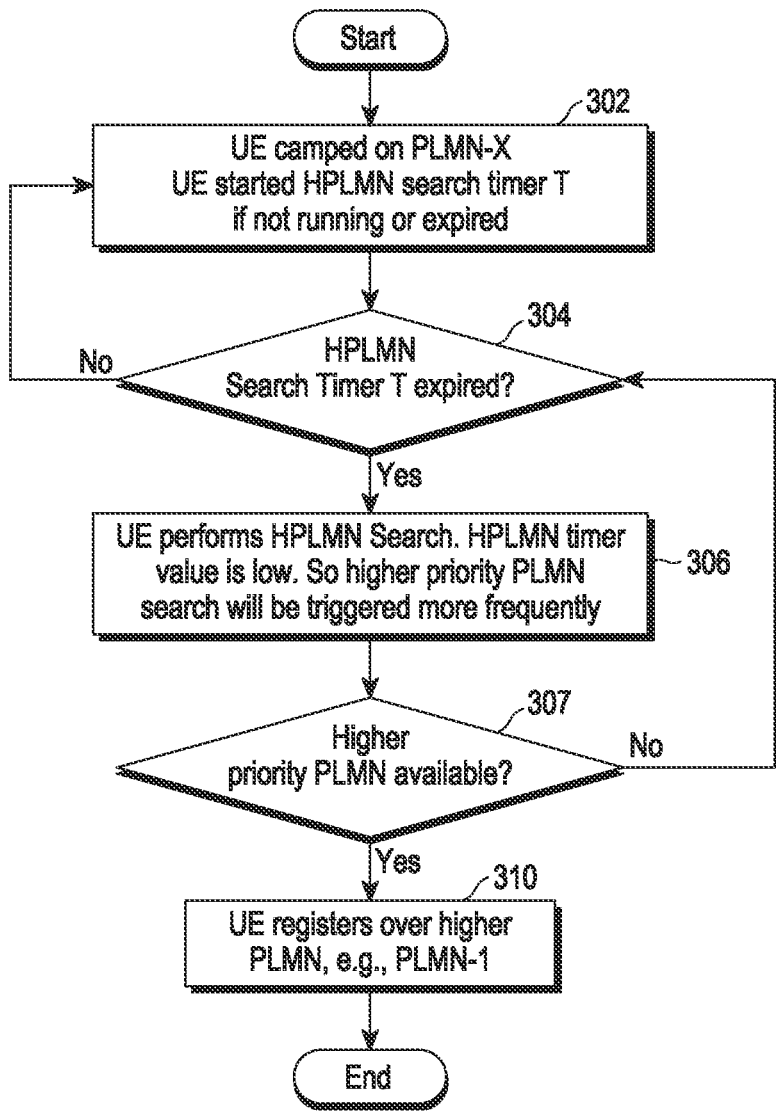
FIGS. 3A and 3B illustrate an issue of high power consumption by a UE to connect to a TN, according to the related art.
Figure 3B:
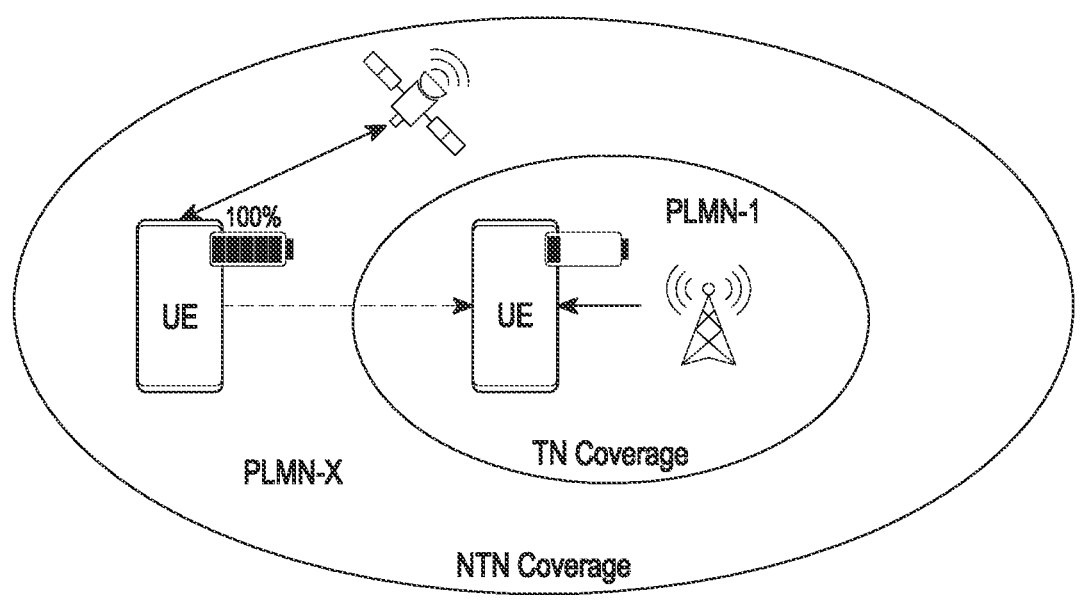
Figure 4:
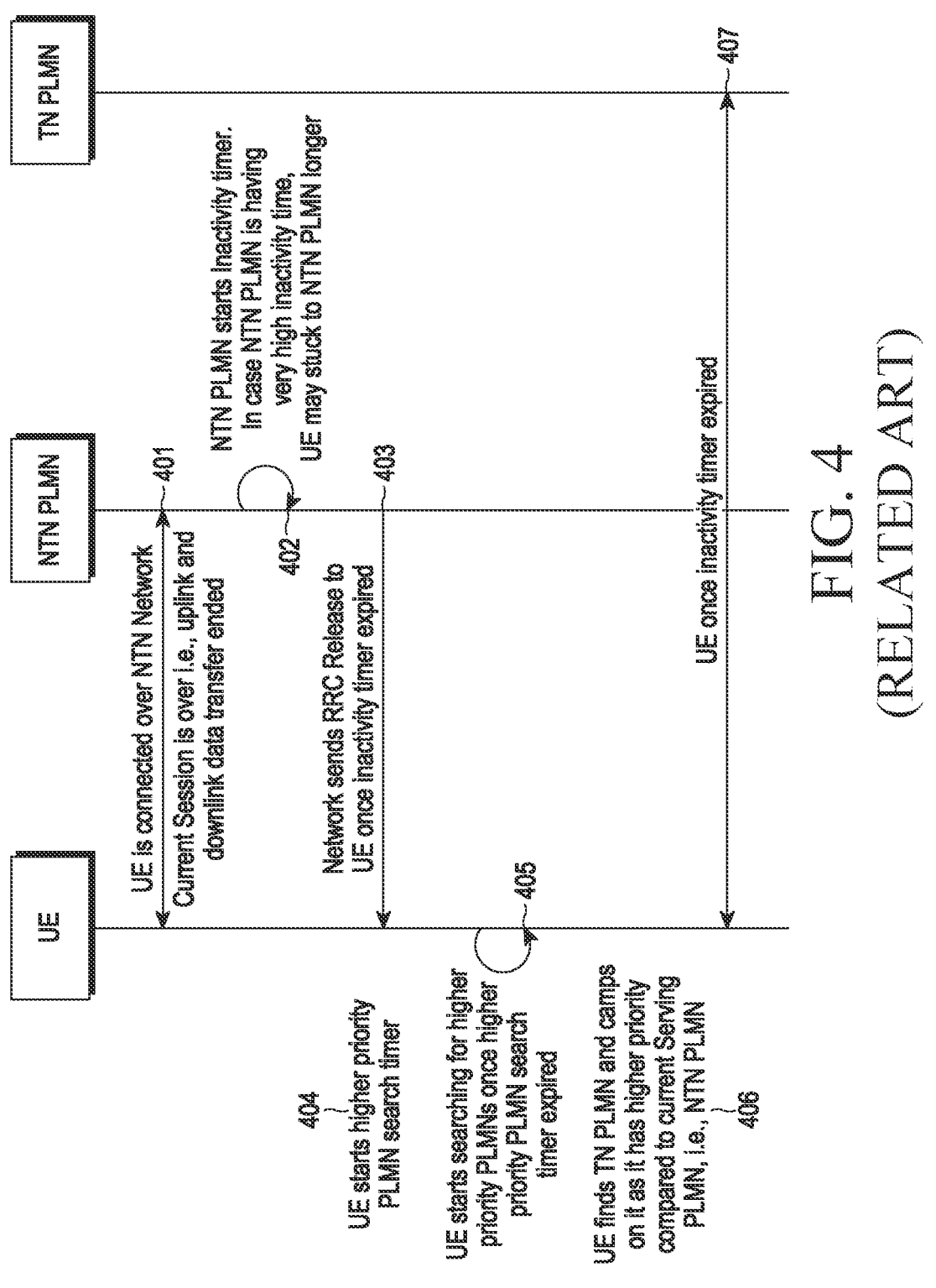
FIG. 4 illustrates an issue of transmission delay at a UE according to the related art.

The following description with reference to the accompanying drawings is provided to assist in a comprehensive understanding of various embodiments of the disclosure by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments, to one embodiment of the disclosure, to several embodiments or to all embodiments. Accordingly, the term "some embodiments" is defined as meaning "no embodiment, or one embodiment, or more than one embodiment of the disclosure, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein, such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features", "one or more elements", "at least one feature", or "at least one element." Furthermore, the use of the terms "one or more" or "at least one" feature or element does NOT preclude there being none of that feature or element, unless otherwise specified by limiting language, such as "there NEEDS to be one or more . . ." or "one or more element is REQUIRED."

Unless otherwise defined, all terms, and especially any technical and/or scientific terms, used herein may be taken to have the same meaning as commonly understood by one having ordinary skill in the art.

Embodiments of the disclosure will be described below with reference to the accompanying drawings.

The terms "terrestrial network", "TN", "TN-based PLMN", and "TN PLMN" have been used interchangeably throughout the description.

Similarly, the terms "non-terrestrial network", "NTN", "NTN-based PLMN", and "NTN PLMN" have been used interchangeably throughout the description.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global position-ing system (GPS) chip, a near field communication (NFC) chip, connectivity chips, a sensor controller, a touch con-troller, a finger-print sensor controller, a display drive inte-grated circuit (IC), an audio CODEC chip, a universal serial bus (USB) controller, a camera controller, an image pro-cessing IC, a microprocessor unit (MPU), a system on chip (SoC), an IC, or the like.

Figure 5:
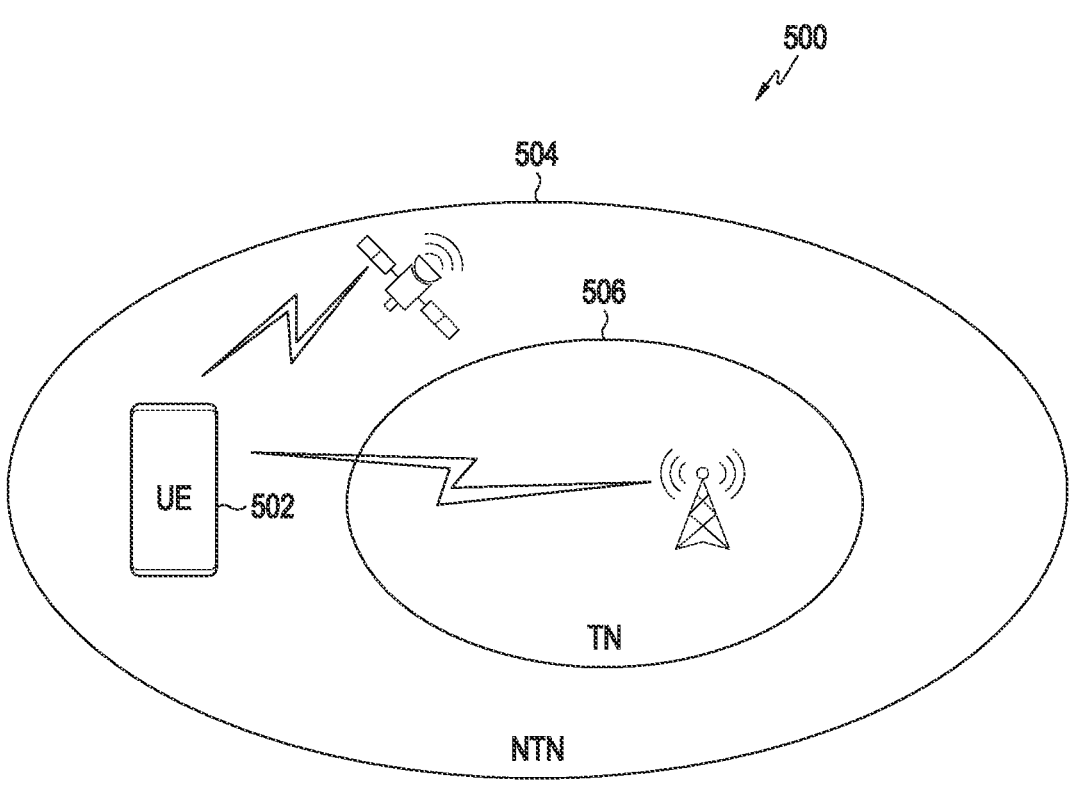
FIG. 5 illustrates an environment of a communication system according to an embodiment of the disclosure.

FIG. 5 illustrates an environment of a communication system according to an embodiment of the disclosure.

Referring to FIG. 5, a communication system 500 may include a UE 502, an NTN 504, and a TN 506. Examples of the UE 502 may include a smartphone, a tablet, a laptop, a portable communication device, and any other suitable device equipped with wireless connection functionality. Further, as discussed above, the TN 506 may include one or more public land mobile networks (PLMNs). Each PLMN includes a mobile switching center (MSC), several cell site antennas, or one or more base stations (BS). MSCs and PLMNs may communicate over a network connection which may include a physical connection or a wireless connection. The NTN 504 may include a network, such as, but is not limited to, a satellite-based cellular network, a high altitude platform station-based cellular network, or an air-to-ground-based network. In some embodiments of the disclosure, the NTN 504 may also include an unmanned aerial vehicle (UAV)-based cellular network. Embodiments and the com-munication system 500 may have any implementation of the UE 502, the NTN 504, and the TN 506, to enable UE 502 to be effectively and efficiently camped on the TN 506.

Figure 6:
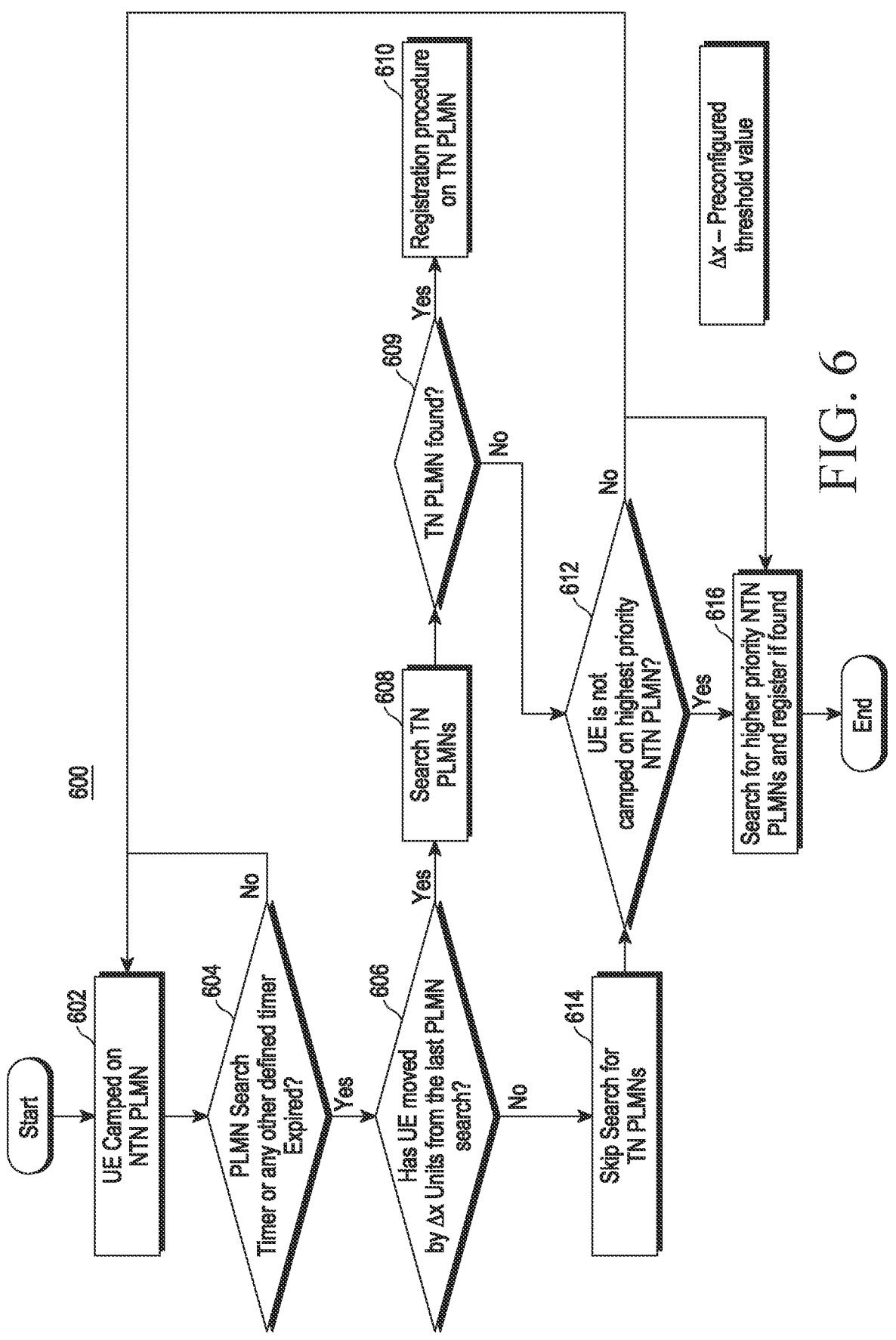
FIG. 6 illustrates a process flow of a method for a high-priority public land mobile network (HPLMN) search according to an embodiment of the disclosure.

FIG. 6 illustrates a process flow of a method for a high-priority public land mobile network (HPLMN) search according to an embodiment of the disclosure.

Referring to FIG. 6, a method 600 may be implemented by the communication system 500. The method 600 may be performed by the UE 502 and/or the NTN PLMN 504, as shown in FIG. 5.

At operation 602, the method 600 indicates that the UE 502 is camped on the PLMN corresponding to the NTN 504 (also referred to as "the NTN PLMN 504").

At operation 604, the method 600 includes determining if a PLMN search timer or any other predefined timer, for example an activity timer, has expired. In an embodiment of the disclosure, the operation 604 may be performed by the UE 502 and/or the NTN PLMN 504.

Upon determining that the PLMN search timer or the other predefined timer has not expired, the method 600 indicates that the UE 502 may remain connected/camped to the NTN PLMN 504, as shown in operation 602.

Upon determining that the PLMN search timer or the other predefined timer has expired, at operation 606, the method 600 includes determining if the UE 502 has moved by a preconfigured threshold value ($\Delta x$) of distance from the last PLMN search. Specifically, the UE 502 may determine if the UE 502 has traveled a distance after connecting to the NTN PLMN 504. The preconfigured threshold value ($4x$) may indicate a value of distance which the UE 502 may move without searching for the HPLMN, i.e., the chances of finding the HPLMN are low within a range of the precon-figured threshold value of the distance.

Upon determining that the UE 502 has not moved the preconfigured threshold value, the method 600 includes skipping the search for the HPLMN, i.e., a PLMN corre-sponding to the TN 506 (also referred to as "the TN PLMN 506"), as shown in operation 614. Thus, the UE 502 may skip the HPLMN search, and may save time and resources required to perform the HPLMN search.

Upon determining that the UE 502 has moved by the preconfigured threshold value of the distance, the method 600 may include performing the HPLMN (i.e., the TN PLMNs) search, as shown in operation 608. The UE 502 may perform the HPLMN search.

At operation 609, the method 600 includes determining if the HPLMN is found. Specifically, the UE 502 determines if TN PLMN 506 is found.

Upon determining that the HPLMN is found at operation 610, the method 600 includes performing a registration procedure with the identified HPLMN. Specifically, the UE 502 may perform the registration procedure on the TN PLMN 506.

At operation 612, the method 600 includes determining if the UE 502 is camped on the highest priority NTN PLMN 504. The operation 612 may also be performed directly after the operation 614.

Upon determining that the UE 502 is not camped on the highest priority PLMN from the NTN 504, the UE 502 may perform the search for the higher priority NTN PLMNs and may register to the said NTN PLMN, if found, as shown in operation 616.

However, upon determining that the UE 502 is camped on the highest priority PLMN from the NTN 504, the method 600 may initialize again with operation 602.

Thus, if the UE 502 is camped on the NTN PLMN 504, then whether to search for the TN and NTN PLMNs may be based on a new optimized timer or existing HPLMN timer value. After the timer expiry, it will be more optimized if the UE 502 may limit the search frequency and bands to search for HPLMN. As an example, if the UE's location before and after the HPLMN search timer expiry remains the same then the UE 502 may perform the higher priority PLMN search only for NTN Network if the current NTN PLMN is not the highest PLMN for the NTN 504. If the UE 502 changes the location from the timer start location value by the preconfigured threshold value (may be configured or based on network configuration), then the UE 502 may perform TN frequency or bands. Alternatively, the UE 502 may optimize the search bands and the frequencies for terrestrial networks and non-terrestrial networks if the UE 502 knows the band and frequency support based on a location (e.g., latitude/ longitude/TAC of GEO NTN PLMN). In addition, it is important to define the search precedence between terrestrial and non-terrestrial PLMNs. Therefore, the UE 502 searches the TN PLMNs/frequencies/bands first before starting to determine NTN PLMN 504 or frequencies/bands. The UE 502 may stop the frequency or the bands search if it finds any TN PLMN and does not proceed to the NTN PLMN/ frequency/band search.

Figure 7:
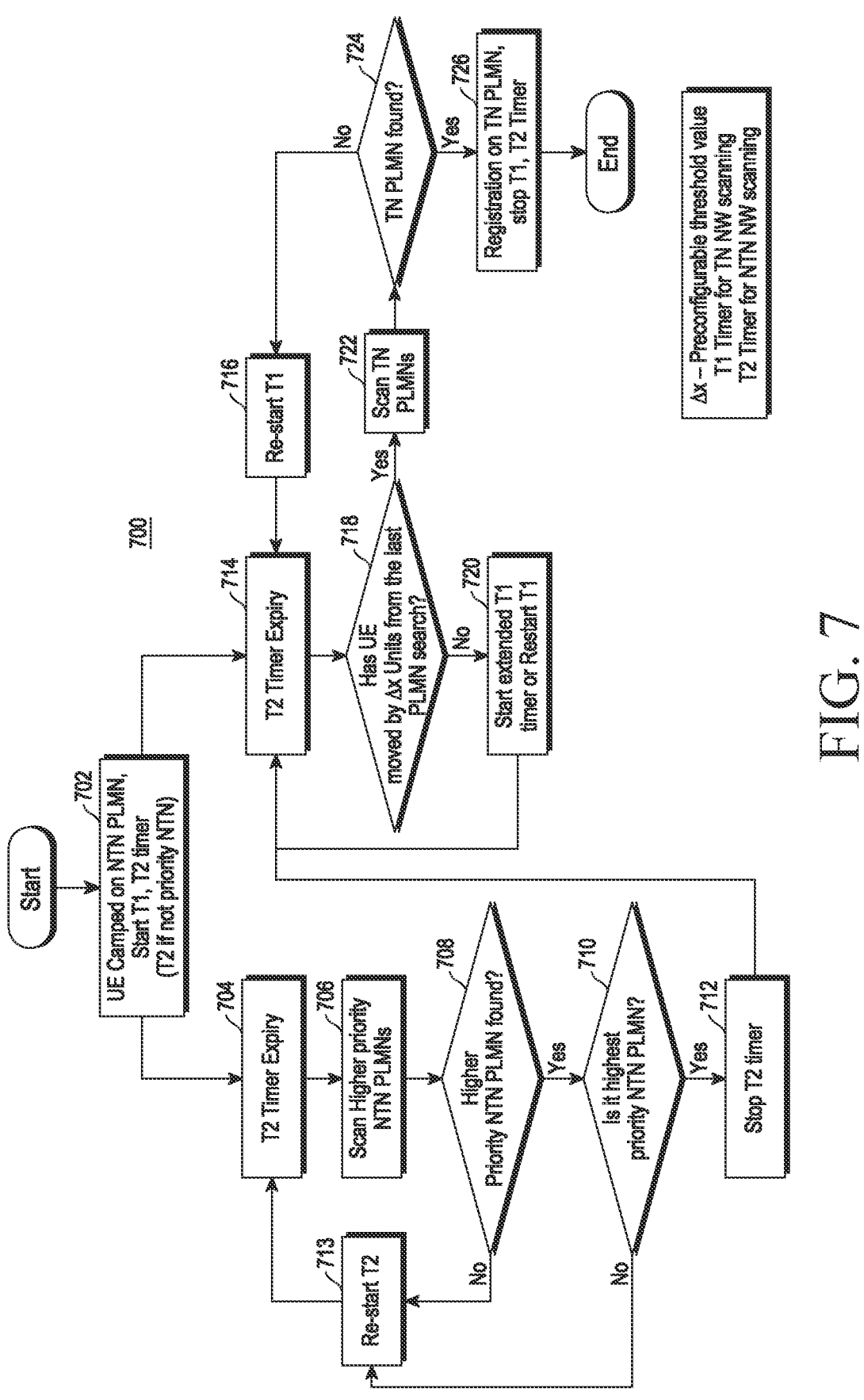
FIG. 7 illustrates a flow diagram depicting a method of maintaining a separate timer for a TN-based PLMN and an NTN-based PLMN according to an embodiment of the disclosure.

FIG. 7 illustrates a flow diagram depicting a method of maintaining a separate timer for a TN PLMN and an NTN PLMN according to an embodiment of the disclosure.

Referring to FIG. 7, a method 700 may be implemented by the communication system 500. The method 700 may be performed by the UE 502 and/or the NTN PLMN 504, as shown in FIG. 5. In accordance with FIG. 7, at operation 702, the UE 502 is in the NTN PLMN. The UE 502 will start timers T1 and T2 simultaneously. However, the timer T2 may only be started when the currently camped PLMN is not the highest priority NTN. The timer T1 and the timer T2 may have the same or different values. Thereafter, at operation 714, if the Timer T1 has expired, then the method 700 may move to operation 718. At operation 718, the UE 502 may determine whether the UE has shifted by the preconfigured threshold value of distance/location from the location the UE 502 started the T1 timer. If the UE 502 identifies that the location has been shifted by the preconfigured threshold value, then the method 700 may move to operation 722. At operation 722, the UE 502 may perform a search for the TN PLMNs. However, if the UE 502 identifies that the UE 502 has not made any change to the location or a location shift of the UE 502 is below the preconfigured threshold value, in the operation 718, then the UE 502 may restart the timer T1 at operation 720. In some embodiments of the disclosure, the UE 502 may also update the timer T1 value by some incremental or decremented value prior to restarting the timer T1. After searching for the TN PLMNs, if the UE 502 identifies any TN PLMN availability at operation 724, then at operation 726, the UE 502 may register with the identified TN PLMN and stop both the timers T1 and T2. However, if the TN PLMN is not found, then the UE 502 may restart the timer T1, at the operation 716.

Further, in case after operation 702, at operation 704, if the UE 502 identifies that the timer T2 has expired, then at operation 706, the UE 502 may initiate a search/scan for higher priority NTN PLMN. After searching, the method 700 moves to operation 708. At operation 708, if the higher priority NTN PLMN is found, then the method 700 moves to operation 710, otherwise the method 700 moves to operation 713. The higher priority NTN PLMN may be found only when the current PLMN is not the highest priority PLMN for the NTN 504. If the UE finds any higher priority NTN PLMNs, the UE 502 may initiate registration with the identified NTN PLMN. In case the current PLMN is the highest priority PLMN, then at operation 712, the UE 502 will stop the timer T2. Otherwise, the method 700 may move to operation 713. At operation 513, the UE 502 may restart the timer T2 timer. Optionally, the UE 502 may update the timer T2 with an incremental or a decremented value of the T2 timer.

In an embodiment of the disclosure, the disclosure discloses that the UE 502 may maintain two different timers, i.e., the timer T1 and T2. The timer T1 is to indicate when to search for the TN PLMNs and the timer T2 is to indicate when to search for the NTN PLMNs. As per the proposed solution, the UE 502 may give priority to the T1 expiry proposed action followed by the T2 expiry proposed action if both the T1 and T2 expire at the same time. Having the two different timers helps the UE 502 to have flexibility in searching for an HPMN.

In another embodiment of the disclosure, any, or both of the timers T1 and T2 may be the same or different than the HPLMN search timer T as per TS 23.122.

Figure 8:
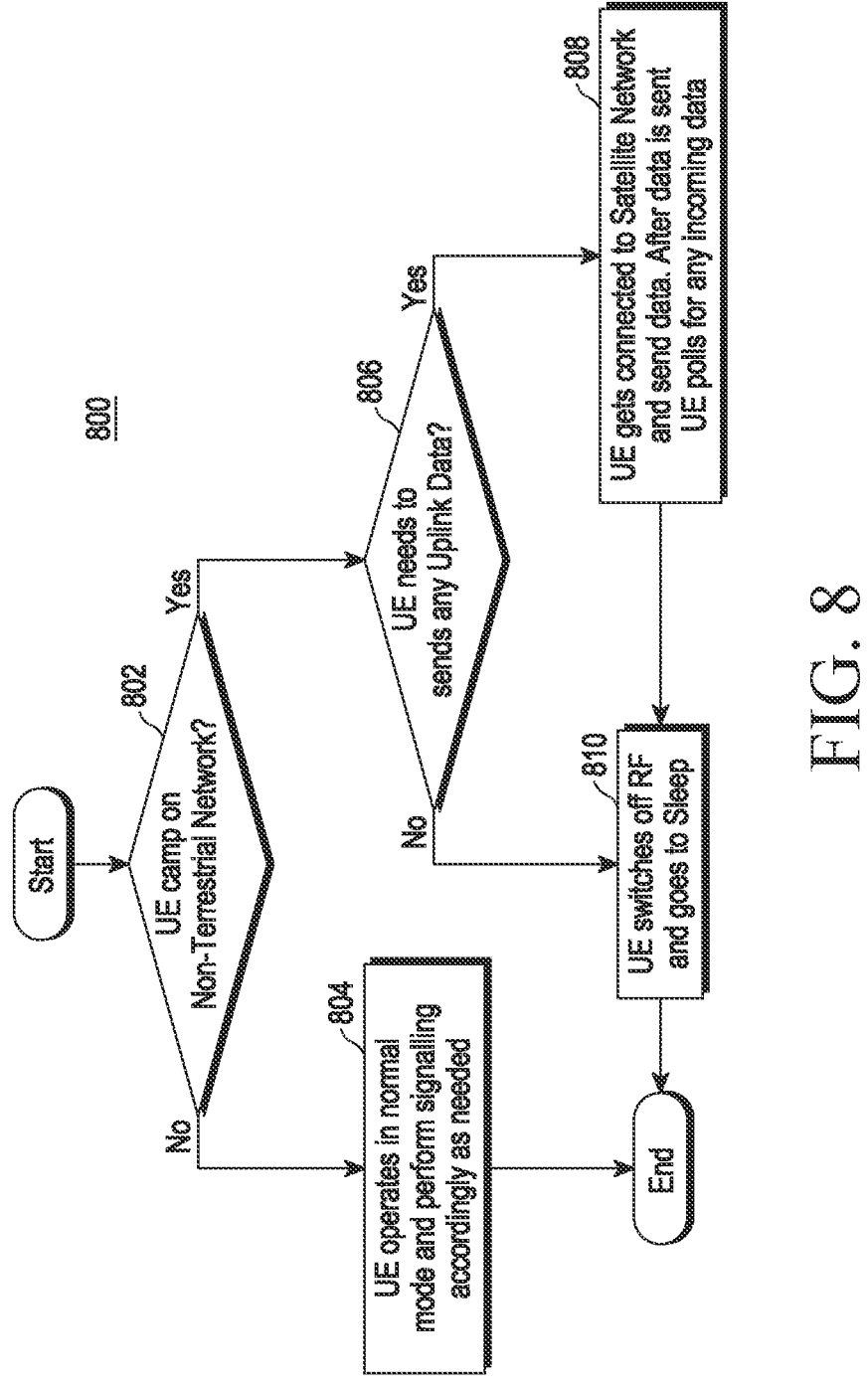
FIG. 8 illustrates a process flow of a method of operating a UE in a mobile initiated connection only (MICO) mode according to an embodiment of the disclosure.

FIG. 8 illustrates a process flow of a method of operating a UE in a mobile initiated connection only (MICO) mode according to an embodiment of the disclosure.

Referring to FIG. 8, a method 800 may be implemented by the communication system 500. Specifically, the method 700 may be performed by the UE 502 and/or the NTN PLMN 504, as shown in FIG. 5.

At operation 802, the method 800 includes determining if the UE 502 is camped/connected on the NTN 504. Specifically, at operation 802, the UE 502 may act in a mobile initiated connection only (MICO) mode when the UE 502 is camped to the NTN 504. Specifically, when the MICO mode is activated and the UE 502 is in an idle state, the NTN 504 will consider the UE 502 to be unreachable. The UE 502 may only receive data when the UE 502 transitions to a connected state. Upon determining that the UE 502 is not camped on the NTN 504, the UE 502 may operate in a normal mode and perform signaling as per the requirements, as shown in operation 804. However, upon determining that the UE 502 is camped/connected on the NTN 504 and acting in the MICO mode, the method 800 includes determining if the UE 502 needs to send any uplink data, at operation 806. More particularly, the UE 502 may determine if the UE 502 has to wake up from a sleep state to transmit a service request to initiate uplink data transmission. Alternatively, at operation 806, the UE 502 may wake up to determine if any downlink data of paging is pending at the NTN 504. In case, the NTN 504 has some data to send, the UE 502 may receive said data at the time of wake-up.

Upon determining that the UE 502 needs to send the uplink data or receive downlink data, the UE 502 may perform the required transmission at operation 808. Upon determining that no uplink or downlink data is required to be transmitted, the UE 502 may switch off the radios and move to the sleep state, as shown in operation 810. Thus, the method 800 enables the UE 502 to save power while in the NTN by avoiding monitoring of downlink signal or data channels all the time.

Figure 9:
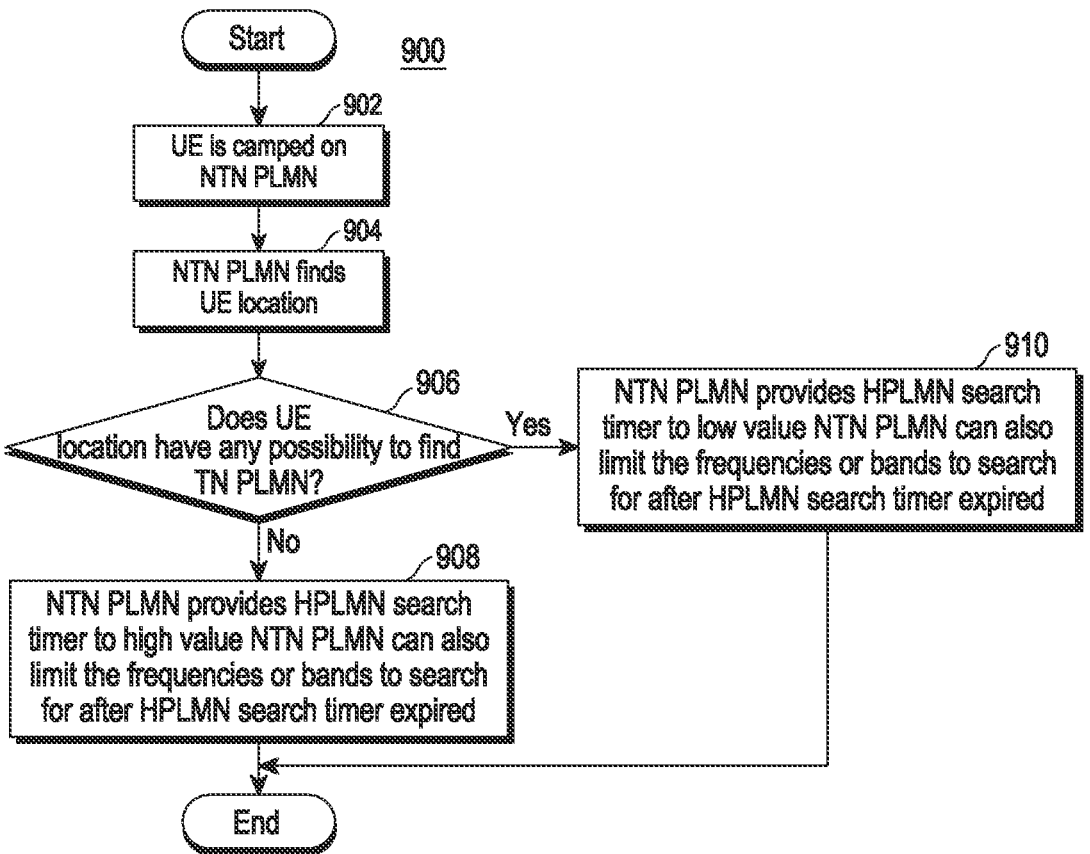
FIG. 9 illustrates a process flow of a method of updating an HPLMN timer by a NTN according to an embodiment of the disclosure.

FIG. 9 illustrates a process flow of a method of updating an HPLMN timer by an NTN according to an embodiment of the disclosure.

Referring to FIG. 9, a method 900 may be implemented by the communication system 500 (shown in FIG. 5). Specifically, the method 900 may be performed by the UE 502 and/or the NTN PLMN 504.

Operation 902 indicates that the UE 502 is camped/ connected to the NTN PLMN 504.

At operation 904, the NTN PLMN 504 may determine the location of the UE 502. In an embodiment of the disclosure, the location of the UE 502 may be transmitted by the UE 502 to the NTN PLMN 504. In another embodiment of the disclosure, the NTN PLMN 504 may determine the location of the UE 502 based on parameters, such as, but not limited to, tracking area identity (TAI).

At operation 906, the NTN PLMN 504 may determine if the UE 502 has any possibility of finding an HPLMN or the TN PLMN 506. If the NTN PLMN 504 identifies that the UE 502 may not be able to find the TN PLMN 506 due to the non-availability of the TN PLMN 506 at the location of the UE 502, the NTN PLMN 504 may update the HPLMN timer, at operation 908. In an embodiment of the disclosure, any network function or an application function corresponding to the NTN PLMN 504 may update the UE 502 with a higher value of the HPLMN search timer to minimize unnecessary battery consumption at the UE 502. Alternatively, the NTN PLMN 504 and the corresponding network or application function entities may provide a required set of bands or frequencies to the UE 502 on which the UE 502 might find a service of the TN 506.

However, if the NTN PLMN 504 identifies that the UE 502 may find the TN PLMN 506 at the location of the UE 502, the NTN PLMN 504 may reduce the HPLMN timer, or configure the UE 502 to immediately perform the HPLMN search, as shown in operation 910. Alternatively, the NTN PLMN 505 may redirect the UE 502 to a particular TN PLMN or frequency by releasing a current N1 NAS signaling or RRC signaling. In some embodiment of the disclosure, at operation 910, the NTN PLMN 504 may issue a handover command to direct the UE 502 from the NTN PLMN 504 to the TN PLMN 506.

In an embodiment of the disclosure, the method 900 may enable the NTN PLMN 504 to update the HPLMN based on the current location of the UE 502. NTN PLMN may update a higher priority PLMN search timer to UE based on the UE's current location. For example, if based on the location of the UE 502, the NTN PLMN 504 finds out that the UE 502 is in a ship or the middle of an ocean, the NTN PLMN 504 may update the HPLMN search timer close to infinity or exceptionally large. On the other hand, if the NTN PLMN 504 knows that at the location of the UE 502, the UE 502 may find the TN PLMNs or a higher priority NTN PLMN, the NTN PLMN 504 may provide a lower HPLMN search timer or provide the HPLMN search timer as 0, i.e., instruct the UE 502 to immediately search for the TN PLMN 506. Thus, the method 900 will help the UE 502 to optimize or save a lot of scanning power as well as promptly connect to the TN PLMN 506.

Figure 10:
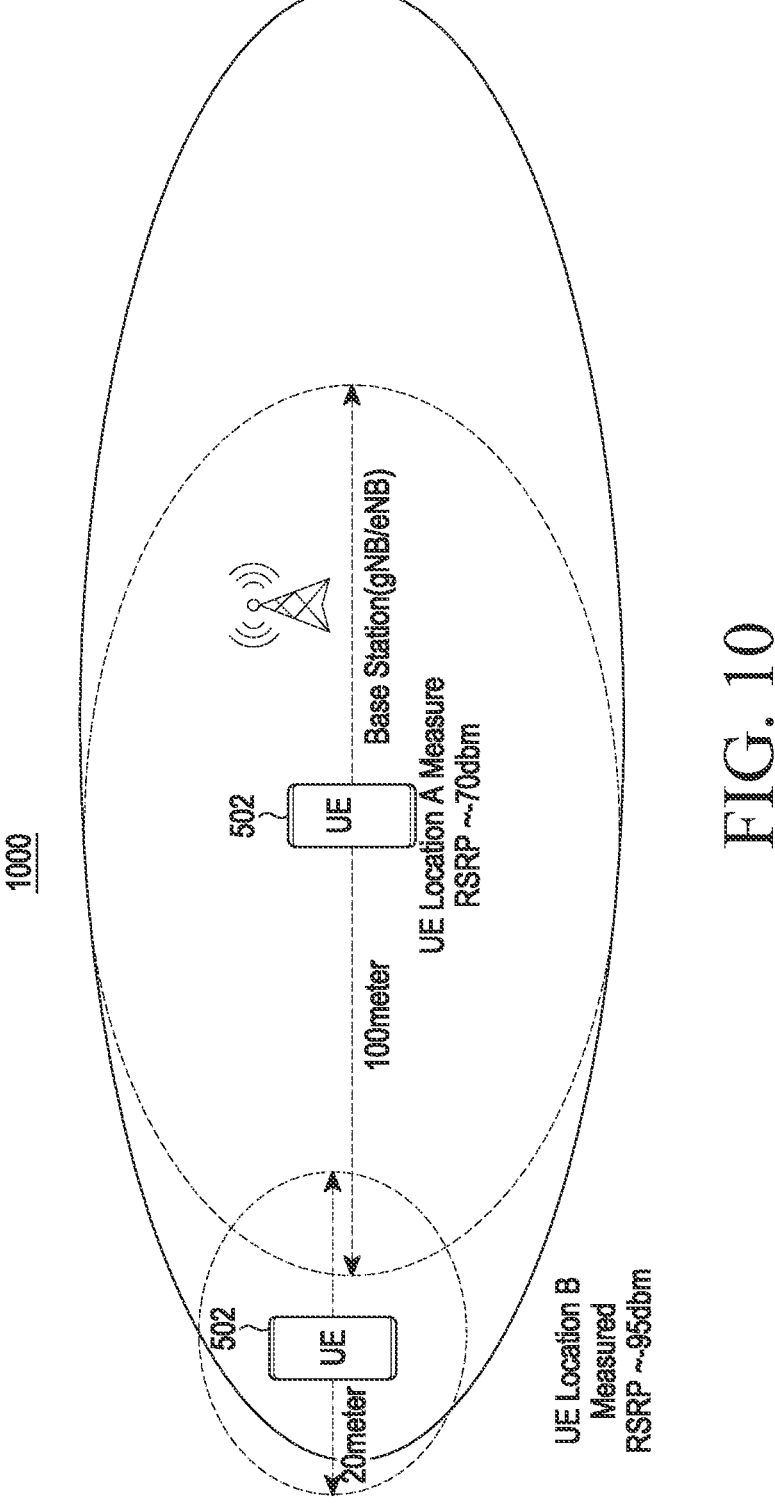
FIG. 10 illustrates a scenario for determining a cell range based on reference signal received power (RSRP) according to an embodiment of the disclosure.

FIG. 10 illustrates a scenario 1000 for determining a cell range based on reference signal received power (RSRP) according to an embodiment of the disclosure.

Referring to FIG. 10, it illustrates that the UE 502 at a location A finds high signal strength, e.g., RSRP equivalent to −70 dbm. As the signal strength is high, the UE 502 may calculate/determine a higher distance or a radius as a cell coverage for the corresponding TN cell. For example, the UE 502 may calculate the cell radius as 100 meters. Further, the UE 502 at location B finds low or moderate signal strength, e.g., RSRP equivalent to −95 dbm. As signal strength is low or moderate, the UE 502 may calculate/determine a lower distance or a radius as a cell coverage for the corresponding TN cell. For example, the UE 502 at location B may calculate the cell radius as 20 meters.

In an embodiment of the disclosure, the UE 502 may determine the cell range for optimizing search parameters to minimize service acquisition and save battery during an HPLMN search. The search parameters may include, but are not limited to, frequencies, bands, radio access technology (RATs), PLMN IDs, or the like. In some embodiments of the disclosure, the UE 502 may utilize a database consisting of location as key or primary key, and for each location a set of frequencies, bands, RATs, PLMN IDs, or the like, that was available as per previous camping information. In a non-limiting example, a schema corresponding to the database may be represented by Table 4:

TABLE 4

| Terrestrial Network availability based on location database schema | | |
|---|---|---|
| Location | (Latitude/ Longitude) | Primary Key |
| Available PLMN ids | List | Secondary Key |
| Available RATs | List | Secondary Key |
| Available Bands | List | Secondary Key |
| Available Frequencies | List | Secondary Key |

In some embodiments of the disclosure, such a database may be stored at a remote server accessed by the UE 502. In other embodiments of the disclosure, the UE may maintain an acquisition database that may contain search parameters used by the UE prior to connecting to the NTN PLMN 504. The UE 502 may use said search parameters to quickly search for the TN PLMN 506. Thus, the UE 502 may save time and resources by effectively searching for the HPLMN based on the location.

Figure 11:
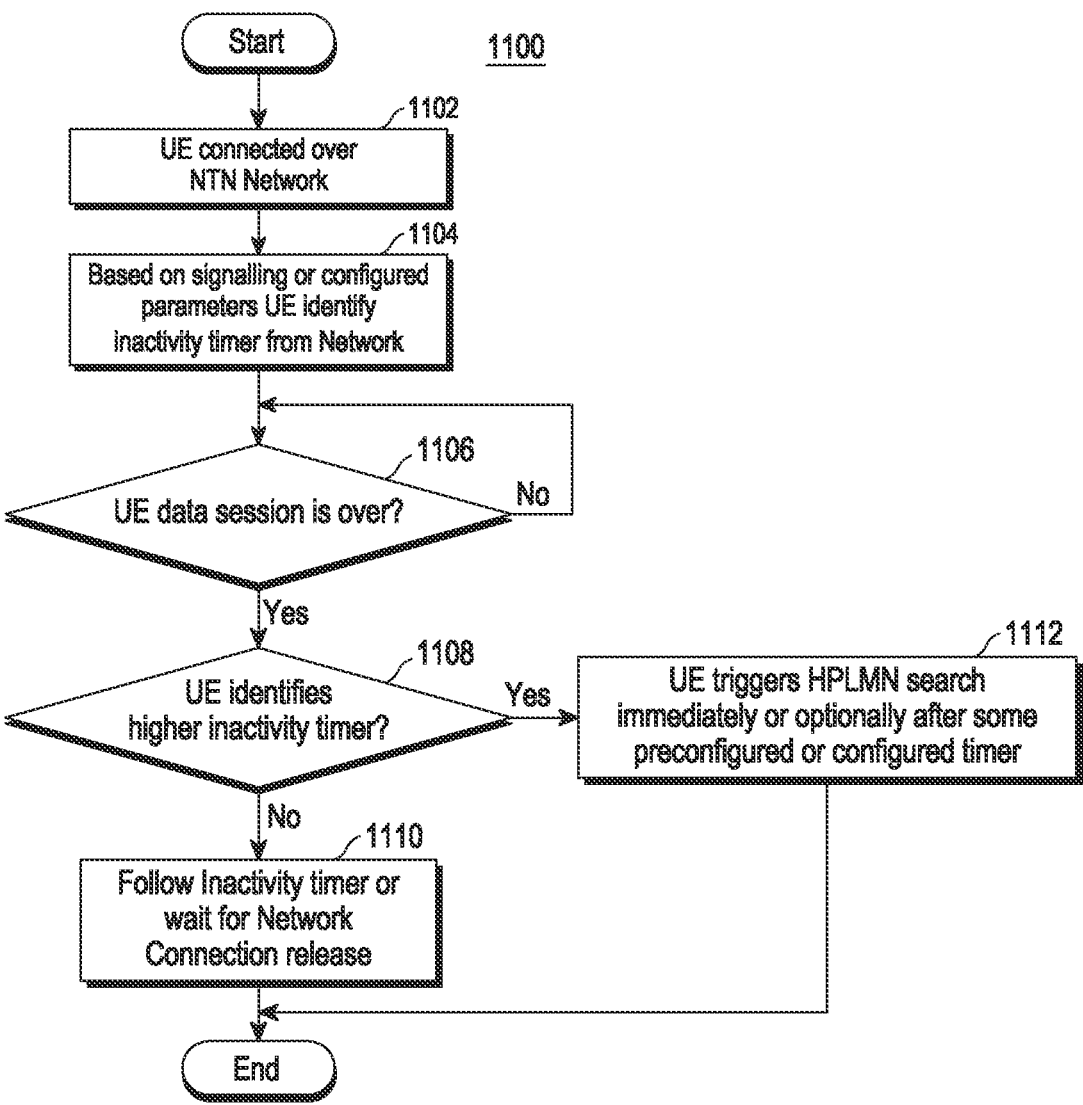
FIG. 11 illustrates a process flow of a method for performing an HPLMN search based on a data session according to an embodiment of the disclosure.

FIG. 11 illustrates a process flow of a method for performing an HPLMN search based on a data session according to an embodiment of the disclosure.

Referring to FIG. 11, a method 1100 may be implemented by the communication system 500 (shown in FIG. 5). Specifically, the method 1100 may be performed by the UE 502 and/or the NTN PLMN 504. In the illustrated scenario, the following assumptions are made:

The TN PLMN 506 has a higher priority as compared to the NTN PLMN 504.

Operation 1102 may indicate that the UE 502 is connected over the NTN PLMN 504. Further, a current data session is over, i.e., the uplink and the downlink data transfer has ended.

At operation 1104, the UE 502 may identify an inactivity timer corresponding to the NTN PLMN 504. In an embodiment of the disclosure, the inactivity timer may be identified based on signaling or preconfigured parameters.

At operation 1106, the UE 502 confirms if the data session of the UE 502 is over. Upon determining that the data session is over, at operation 1108, the UE 502 may identify if the inactivity timer of the NTN PLMN 502 is higher. Upon determining that the inactivity timer has a low value, at operation 1110, the UE 502 may follow the inactivity timer and wait for the NTN PLMN 504 to release the connection. At operation 1110, the NTN PLMN 504 may release the RRC connection upon expiration of the inactivity timer.

However, upon determining that the inactivity timer has a higher value, the UE 502 may trigger the HPLMN search immediately or optionally after some preconfigured or configured timer, as shown in operation 1112. Upon identifying the TN PLMN or a higher priority NTN PLMN, the UE 502 may camp to said PLMN.

Thus, the method 1100 may prevent the UE 502 from being stuck to the NTN PLMN 504 for a location duration than required, thereby saving power and resources at the UE 502 and the NTN PLMN 504.

Figure 12:
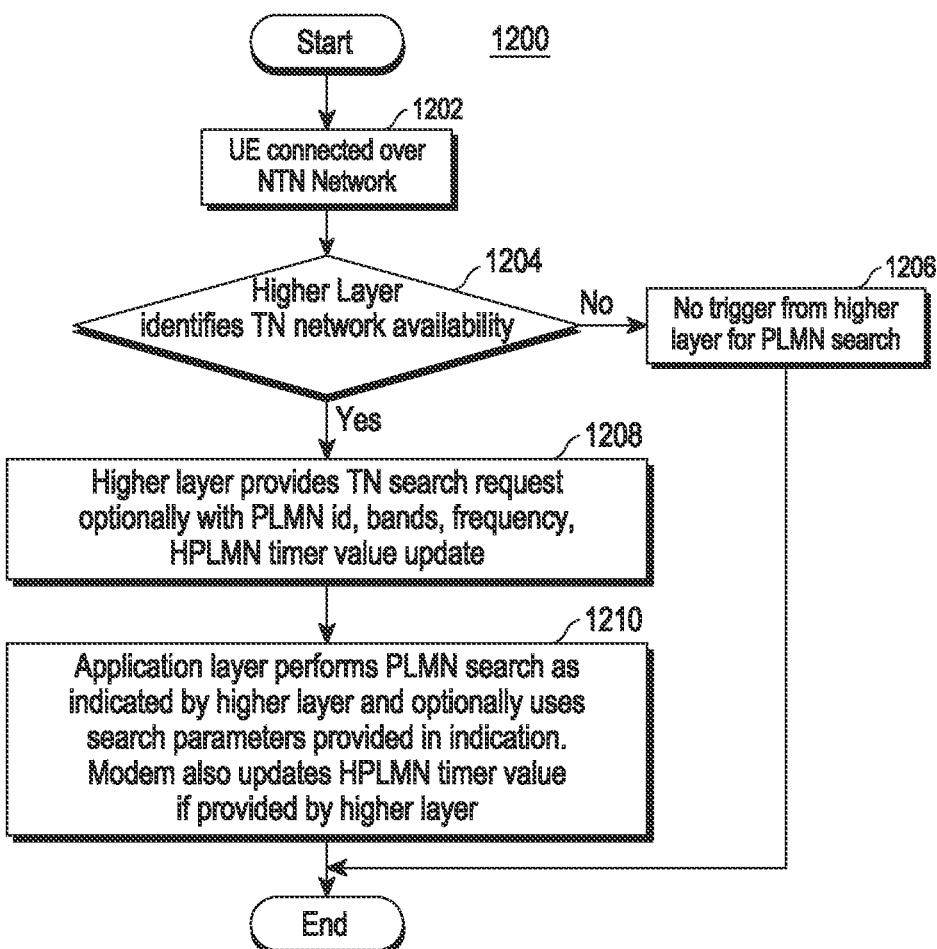
FIG. 12 illustrates a process flow of a method for performing an HPLMN search by a higher layer of a UE according to an embodiment of the disclosure.

FIG. 12 illustrates a process flow of a method for performing an HPLMN search by a higher layer of a UE according to an embodiment of the disclosure.

Referring to FIG. 12, a method 1200 may be implemented by the communication system 500 (shown in FIG. 5). Specifically, the method 1200 may be performed by the UE 502. In the illustrated scenario, the following assumptions are made:

The TN PLMN 506 has a higher priority as compared to the NTN PLMN 504.

Operation 1202 may indicate that the UE 502 is connected over the NTN PLMN 504.

At operation 1204, a higher layer and/or an application layer of the UE 502 may determine if the TN PLMN 506 is available. In case no TN PLMN 506, the method 1200 moves to operation 1206, where the higher layer may not perform any action with respect to the HPLMN search. However, upon determining the availability of the TN PLMN 506, the higher layer generates a TN PLMN search request, at operation 1208. The TN PLMN search request may also include search parameters, such as, but not limited to, PLMN id, bands, frequency, HPLMN timer value update, or the like.

At operation 1210, the application layer of the UE 502 may perform the HPLMN search as indicated by the higher layer in the TN PLMN search request. In some embodiments of the disclosure, the application layer may perform the HPLMN search based on the search parameters provided in the TN PLMN search request. In an embodiment of the disclosure, the application layer may also update the HPLMN timer if an update request is included in the TN PLMN search request.

Figure 13:
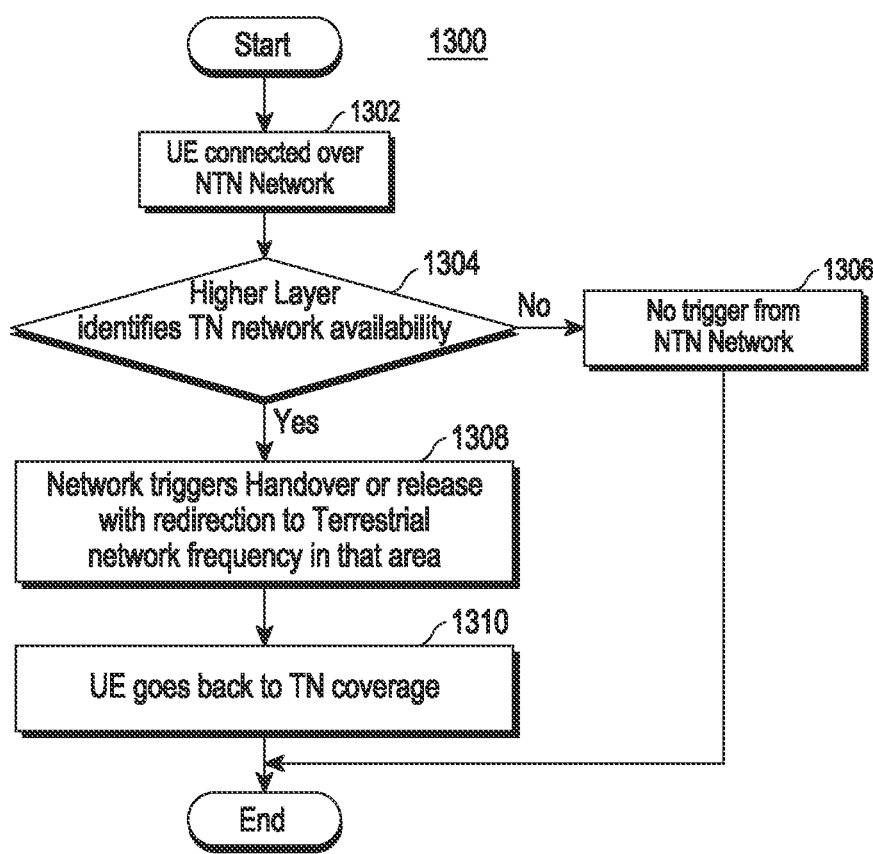
FIG. 13 illustrates a process flow of a method for performing handover to a TN-based PLMN according to an embodiment of the disclosure.

FIG. 13 illustrates a process flow of a method for performing a handover a TN PLMN according to an embodiment of the disclosure.

Referring to FIG. 13, a method 1300 may be implemented by the communication system 500 (shown in FIG. 5). Specifically, the method 1300 may be performed by the UE 502. In the illustrated scenario, the following assumptions are made:

The TN PLMN 506 has a higher priority as compared to the NTN PLMN 504.

Operation 1302 may indicate that the UE 502 is connected over the NTN PLMN 504.

At operation 1304, the higher layer and/or an application layer of the UE 502 may determine if the TN PLMN 506 is available. In case no TN PLMN 506, the method 1300 moves to operation 1306, where the higher layer may not perform any action with respect to the HPLMN search. However, upon determining an availability of the TN PLMN 506, the higher layer triggers a handover or a release with redirection of the connection to the TN PLMN 506, at operation 1308. Operation 1310 may indicate that the UE 502 is successfully camped to the TN PLMN 506.

Figure 14:
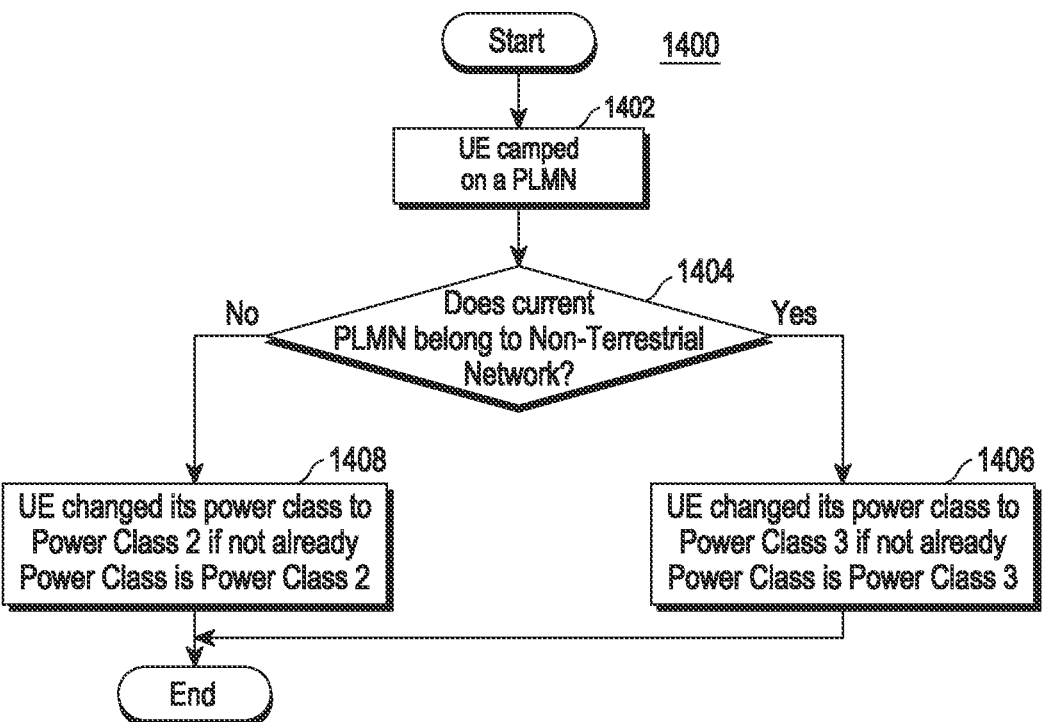
FIG. 14 illustrates a process flow of a method for updating a power class of a UE based on a camped PLMN according to an embodiment of the disclosure.

FIG. 14 illustrates a process flow of a method for updating a power class of a UE based on a camped PLMN according to an embodiment of the disclosure.

Referring to FIG. 14, a method 1400 may be implemented by the communication system 500 (shown in FIG. 5). Specifically, the method 1400 may be performed by the UE 502. In the illustrated scenario, the following assumptions are made:

The TN PLMN 506 has a higher priority as compared to the NTN PLMN 504.

Operation 1402 may indicate that the UE 502 is connected over a PLMN. At operation 1404, the UE 1304 may determine if the UE 502 is camped to the NTN PLMN 504. Upon determining that the UE 502 is camped to the NTN PLMN 504, the UE 502 may change the corresponding power class, as shown in operation 1406. Specifically, the UE 502 may change the corresponding power class to a Power Class 3, if the UE 502 is not already Power Class 3. The Power Class 3 may correspond to a transmission power of approximately 26 dbm. However, upon determining that the UE 502 is not camped to the NTN PLMN 504, the UE 502 may change the corresponding power class, as shown in operation 1408. Specifically, the UE 502 may change the corresponding power class to a Power Class 2, if the UE 502 is not already Power Class 2. Specifically, the UE 502 may act as a High Power UE (HPUE) when connected to the NTN PLMN 504. Thus, the UE 502 ensures that the transmitted data reaches satellites/long-range receivers implementing the NTN PLMN 504. Therefore, the method 1300 avoids multiple retransmissions and thus saves a lot of power at the UE 502.

The Table 5 may represent the power class configuration of the UE 502:

TABLE 5

| Classes | Max Output Power | Operating Bands |
|---|---|---|
| Power Class 2 | 23 dBm | n41, n77, n78, n79 |
| Power Class 3 | 26 dBm | All bands within FR1 |

FIG. 15 illustrates a process flow depicting a method for power management at a UE according to an embodiment of the disclosure.

Referring to FIG. 15, a method 1500 may be performed by a UE 502.

At operation 1502, the method 1500 includes establishing, by the UE 502 located at an initial location, a RRC connection with the NTN-based PLMN (also referred to as the NTN PLMN 504, as used throughout the specification).

At operation 1504, the method 1500 includes initializing a first timer for performing an NTN-based PLMN search and a second timer for performing a Terrestrial Network (TN)-based PLMN search.

At operation 1506, the method 1500 includes performing a search for the NTN-based PLMN having a priority higher than the connected NTN-based PLMN upon determining a lapse of the first timer.

At operation 1508, the method 1500 includes determining the current location of the UE to perform the PLMN search for the TN-based PLMN search upon determining a lapse of the second timer.

At operation 1510, the method 1500 includes determining whether to perform the PLMN search for identifying the PLMN with a higher priority than the connected NTN-based PLMN based at least on the initial location and the current location of the UE.

At operation 1512, the method 1500 includes identifying one or more search parameters based at least on the current location of the UE.

At operation 1514, the method 1500 includes performing one of the PLMN search upon determining that a distance between the initial location and the current location of the UE is greater than a predetermined threshold distance value or skipping the PLMN search upon determining that the distance between the initial location and the current location of the UE is less than the predetermined threshold distance value. In some embodiments of the disclosure, the method 1500 also includes receiving one or more network-related parameters from the connected NTN-based PLMN to perform the PLMN search. Examples of the one or more network-related parameters include, but are not limited to, a frequency, a band, a cell identifier, and a PLMN identifier. The method 1500 also includes initializing a predefined PLMN search timer to perform the PLMN search. The predefined PLMN search timer may define a duration the UE 502 needs to wait before performing the PLMN search. The method 1500 may further include monitoring the predefined PLMN search timer. Further, the method 1500 may include determining the current location of the UE upon determining that the predefined PLMN search timer has lapsed and performing the PLMN search. Upon successfully identifying the higher priority PLMN, the method 1500 may include establishing the RRC connection with the identified TN or higher priority NTN-based PLMN. In some embodiments of the disclosure, the priority of the identified NTN-based PLMN is based at least on signal strength and one or more network services.

Embodiments are in nature and the operations of the method 1500 as shown in FIG. 15 may occur in variations to the sequence in accordance with various embodiments. The variation may also include the addition of operations.

FIG. 16 illustrates a process flow depicting a method for power management at a UE according to an embodiment of the disclosure.

Referring to FIG. 16, a method 1600 may be performed by the UE 502.

At operation 1602, the method 1600 includes establishing, by the UE 502 located at an initial location, the RRC connection with the NTN PLMN 504.

At operation 1604, the method 1600 includes determining whether uplink data transmission is required with the connected NTN-based PLMN 504.

At operation 1606, the method 1600 includes activating a sleep state upon determining that there is no uplink data transmission is required with the connected NTN-based PLMN 504.

Embodiments are in nature and the operations of the method 1600 as shown in FIG. 16 may occur in variations to the sequence in accordance with various embodiments. The variation may also include the addition of operations.

Figure 17:
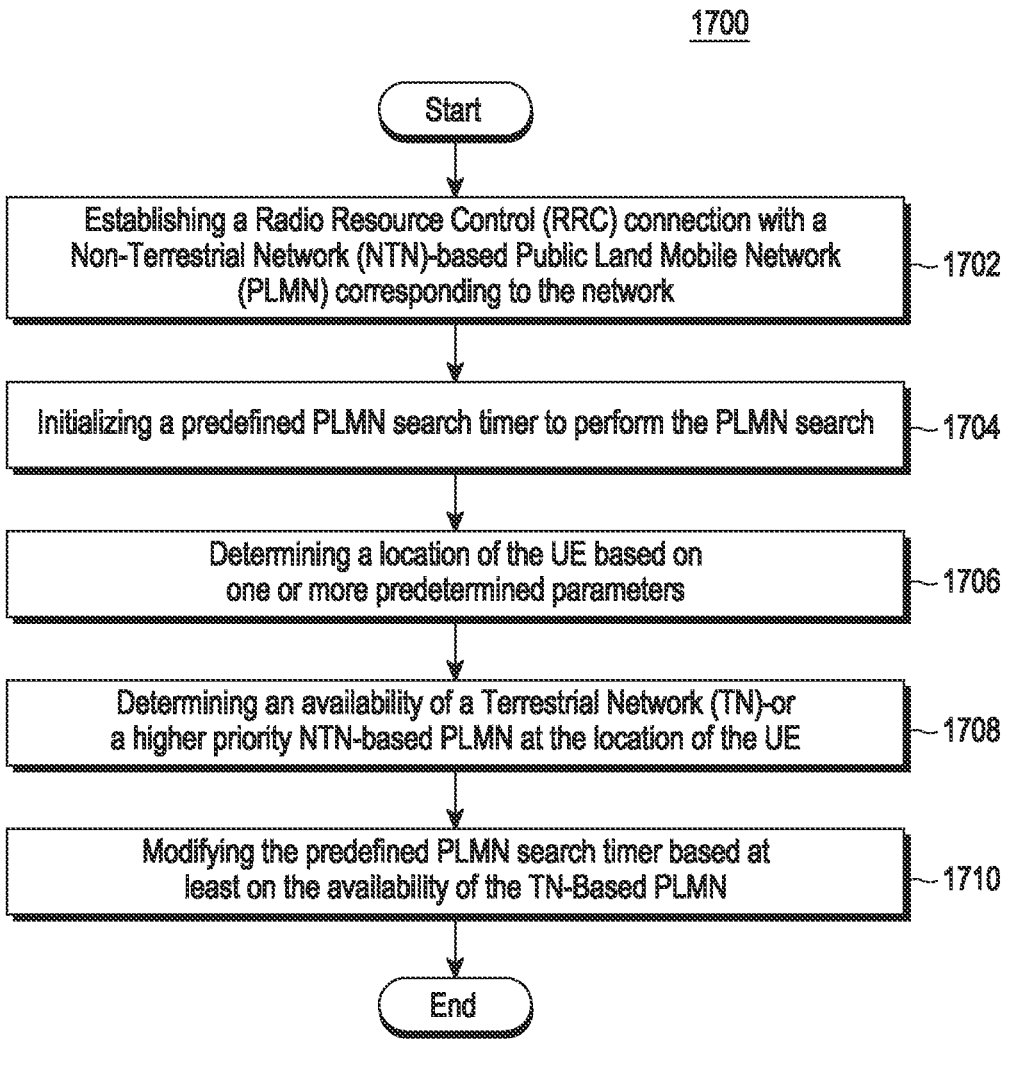
FIG. 17 illustrates a process flow depicting a method for power management at a UE by a network according to an embodiment of the disclosure.

FIG. 17 illustrates a process flow depicting a method for power management at a UE by a network according to an embodiment of the disclosure.

Referring to FIG. 17, at operation 1702, the method 1700 includes establishing the RRC connection with the NTN PLMN 504 corresponding to the network.

At operation 1704, the method 1700 includes initializing a predefined PLMN search timer to perform the PLMN search. The predefined PLMN search timer defines the duration the UE 502 needs to wait before performing a PLMN search.

At operation 1706, the method 1700 includes determining a location of the UE 502 based on one or more predetermined parameters.

At operation 1708, the method 1700 includes determining an availability of a terrestrial network (TN) or a higher priority NTN-based PLMN at the location of the UE 502.

At operation 1710, the method 1700 includes modifying the predefined PLMN search timer based at least on the availability of the TN-Based PLMN. The method 1700 may include increasing the duration defined by the predefined PLMN search timer upon determining that there is no availability of the TN-based PLMN at the location of the UE 502. Further, the method 1700 may include reducing the duration defined by the predefined PLMN search timer upon determining that there is no availability of the TN-based PLMN at the location of the UE 502.

Embodiments are in nature and the operations of the method 1700 as shown in FIG. 17 may occur in variations to the sequence in accordance with various embodiments. The variation may also include the addition of operations.

FIG. 18 illustrates a process flow depicting a method for power management at a UE according to an embodiment of the disclosure.

Referring to FIG. 18, a method 1800 may be performed by the UE 502.

At operation 1802, the method 1800 includes establishing the RRC connection with the NTN PLMN 504.

At operation 1804, the method 1800 includes identifying a value of the inactivity timer to release the RCC connection based on one or more of the signaling parameters.

At operation 1806, the method 1800 includes determining the completion of a current data transmission session with the connected NTN PLMN 504.

At operation 1808, the method 1800 includes performing the PLMN search upon determining that the value of the inactivity timer is greater than a predefined threshold value corresponding to the inactivity timer and the completion of the current data transmission.

Embodiments are in nature and the operations of the method 1800 as shown in FIG. 18 may occur in variations to the sequence in accordance with various embodiments. The variation may also include the addition of operations.

Figure 19:
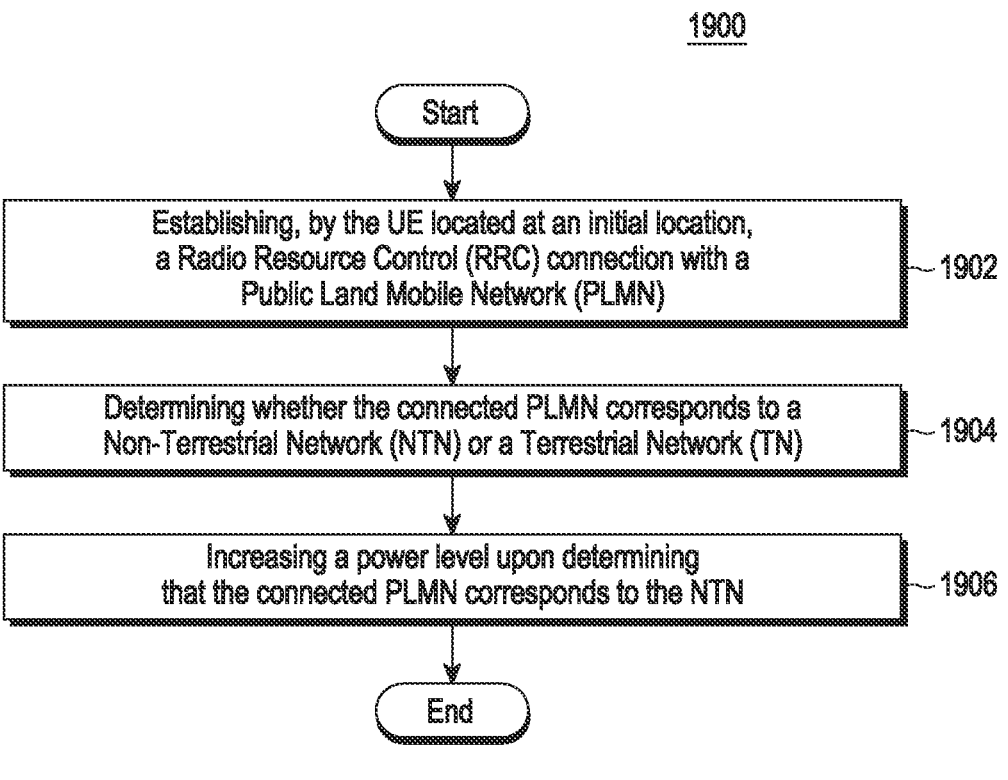
FIG. 19 illustrates a process flow depicting a method for power management at a UE according to an embodiment of the disclosure.

FIG. 19 illustrates a process flow depicting a method for power management at a UE according to an embodiment of the disclosure.

Referring to FIG. 19, a method 1900 may be performed by the UE 502.

At operation 1902, the method 1900 includes establishing the RRC connection with a Public Land Mobile Network (PLMN).

At operation 1904, the method 1900 includes determining whether the connected PLMN corresponds to the NTN or the TN.

At operation 1906, the method 1900 includes increasing a power level upon determining that the connected PLMN corresponds to the NTN.

Embodiments are in nature and the operations of the method 1900 as shown in FIG. 19 may occur in variations to the sequence in accordance with various embodiments. The variation may also include the addition of operations.

Figure 20:
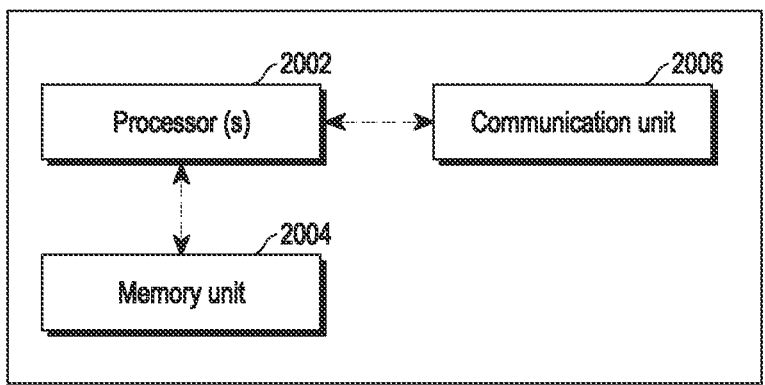
FIG. 20 illustrates a diagram of a network according to an embodiment of the disclosure.

FIG. 20 illustrates a diagram of a network according to an embodiment of the disclosure.

Referring to FIG. 20, a network 2000 may correspond to the TN and the NTN, as discussed throughout this disclosure. The network 200 may include at least one processor 2002, memory unit 2004 (e.g., memory), and a communication unit 2006 (e.g., communicator or communication interface). Further, the network 2000 may also include the cloud-RAN (C-RAN), a central unit (CU), a core network (NW), a distributed unit (DU), or the any other possible network (NW) entity. The communication unit 2006 may perform one or more functions for transmitting and receiving signals via a wireless channel.

As an example, the at least one processor 2002 may be a single processing unit or a number of units, all of which could include multiple computing units. The at least one processor 2002 may be implemented as one or more microprocessors, microcomputers, microcontrollers, digital signal processors, central processing units, state machines, logic circuitries, and/or any devices that manipulate signals based on operational instructions. Among other capabilities, the at least one processor 2002 is configured to fetch and execute computer-readable instructions and data stored in the memory. The at least one processor 2002 may include one or a plurality of processors. At this time, one or a plurality of processors 2002 may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The one or a plurality of processors 2002 may control the processing of the input data in accordance with a predefined operating rule or artificial intelligence (AI) model stored in the non-volatile memory and the volatile memory, i.e., memory unit 2004. The predefined operating rule or artificial intelligence model is provided through training or learning.

The memory unit 2004 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 21:
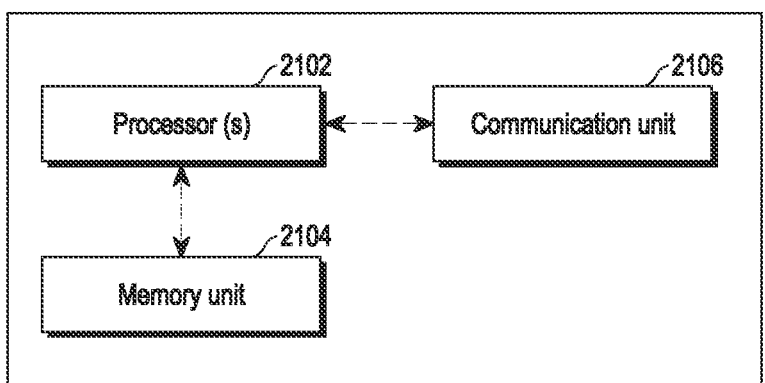
FIG. 21 is a diagram illustrating a configuration of a UE according to an embodiment of the disclosure.

FIG. 21 is a diagram illustrating a configuration of a UE in a wireless communication system according to an embodiment of the disclosure.

The configuration of FIG. 21 may be understood as a part of the configuration of a UE 2100. Further, the methods 1500-1900 as disclosed above may be implemented in the UE 2100 according to a further embodiment. In an embodiment of the disclosure, the UE 2100 corresponds to the UE 502. Hereinafter, it is understood that terms including "unit" or "module" at the end may refer to the unit for processing at least one function or operation and may be implemented in hardware, software, or a combination of hardware and software.

Referring to FIG. 21, the UE 2100 may include at least one processor 2102, a communication unit 2106 (e.g., communicator or communication interface), and memory unit 2104 (e.g., storage). By way of example, the UE 2100 may be a cellular phone or other device that communicates over a plurality of cellular networks (such as a 3G, 4G, a 5G or pre-5G, sixth generation (6G) network or any future wireless communication network). The communication unit 2106 may perform functions for transmitting and receiving signals via a wireless channel.

As an example, the processor 2102 may be a single processing unit or a number of units, all of which could include multiple computing units. The processor 2102 may be implemented as one or more microprocessors, microcomputers, microcontrollers, digital signal processors, central processing units, state machines, logic circuitries, and/or any devices that manipulate signals based on operational instructions. Among other capabilities, the processor 2102 is configured to fetch and execute computer-readable instructions and data stored in the memory. The processor 2102 may include one or a plurality of processors. At this time, one or a plurality of processors 602 may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The one or a plurality of processors 2102 may control the processing of the input data in accordance with a predefined operating rule or artificial intelligence (AI) model stored in the non-volatile memory and the volatile memory, i.e., memory unit 2104. The predefined operating rule or artificial intelligence model is provided through training or learning.

The memory 2100 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The disclosure provides a better user experience by prioritizing a TN-based PLMN. Further, the disclosure provides techniques to stop unnecessary HPLMN scanning and thereby save a considerable amount of power for UE. Further, the disclosure enables faster TN-based PLMN camping.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown, nor do all of the acts necessarily need to be performed. In addition, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for power management at a user equipment (UE), the method comprising:

establishing, by the UE, a radio resource control (RRC) connection with a non-terrestrial network (NTN)-based public land mobile network (PLMN);

monitoring a first PLMN search timer for performing an NTN-based PLMN search and a second PLMN search timer for performing a terrestrial network (TN)-based PLMN search;

performing a PLMN search for identifying a PLMN with a higher priority than the connected NTN-based PLMN upon determining that the first or the second PLMN search timer has lapsed; and establishing a RRC connection with the PLMN with the higher priority than the connected NTN-based PLMN.

2. The method of claim 1, wherein the determining of whether to perform the PLMN search comprises:

determining whether to perform the PLMN search for identifying a TN-based PLMN or an NTN-based PLMN which is assigned a higher priority as compared to the connected NTN-based PLMN.

3. The method of claim 1, wherein the performing of the PLMN search comprises:

receiving one or more network-related parameters from the connected NTN-based PLMN; and performing the PLMN search based at least on the one or more received network-related parameters.

4. The method of claim 3, wherein the one or more network-related parameters comprises at least one of a frequency, a band, a cell identifier, or a PLMN identifier.

5. The method of claim 1, wherein the performing of the PLMN search comprises identifying a TN-based PLMN or an NTN-based PLMN having a priority higher than the connected NTN-based PLMN.

6. The method of claim 5, wherein a priority of the identified NTN-based PLMN is based at least on a signal strength and one or more network services.

7. The method of claim 1, wherein the method further comprising:

determining a current location of the UE based on at least one a cell ID, global positioning system (GPS) coordinates, a tracking area code (TAC), a PLMN ID, and neighbour cell information, wherein the performing of the PLMN search comprises performing the PLMN search upon determining that a distance between an initial location of the UE and the current location of the UE is greater than a predetermined threshold distance value.

8. The method of claim 1, wherein the performing of the PLMN search comprises:

performing the NTN-based PLMN search having a priority higher than the connected NTN-based PLMN upon determining a lapse of the first timer; and performing the TN-based PLMN search upon determining a lapse of the second timer.

9. The method of claim 7, further comprising:

identifying one or more search parameters based at least on a current location of the UE; and performing the PLMN search based on at least one of the one or more search parameters upon determining that the distance between the initial location and the current location of the UE is greater than the predetermined threshold distance value.

10. The method of claim 9, wherein the one or more search parameters comprises at least one of a set of frequencies, a frequency band, a radio access technology (RAT), or a PLMN identifier.

11. A system for power management at a user equipment (UE), the system comprising:

one or more processors; and memory storing one or more computer programs including computer-executable instructions that, when executed by the one or more processors, cause the system to:

establish a radio resource control (RRC) connection with a non-terrestrial network (NTN)-based public land mobile network (PLMN), monitor a first PLMN search timer for performing an NTN-based PLMN search and a second PLMN search timer for performing a terrestrial network (TN)-based PLMN search, perform a PLMN search for identifying a PLMN with a higher priority than the connected NTN-based PLMN upon determining that the first or the second PLMN search timer has lapsed, and establish a RRC connection with the PLMN with the higher priority than the connected NTN-based PLMN.

12. The system of claim 11, wherein, to determine whether to perform the PLMN search, the one or more computer programs further comprise computer-executable instructions that, when executed by the one or more processors, cause the system to:

determine whether to perform the PLMN search for identifying a TN-based PLMN or an NTN-based PLMN which is assigned a higher priority as compared to the connected NTN-based PLMN.

13. The system of claim 11, wherein, to perform the PLMN search, the one or more computer programs further comprise computer-executable instructions that, when executed by the one or more processors, cause the system to:

receive one or more network-related parameters from the connected NTN-based PLMN, and perform the PLMN search based at least on the one or more received network-related parameters.

14. The system of claim 13, wherein the one or more network-related parameters comprises at least one of a frequency, a band, a cell identifier, or a PLMN identifier.

15. The system of claim 11, wherein, to perform the PLMN search, the one or more computer programs further comprise computer-executable instructions that, when executed by the one or more processors, cause the system to identify a TN-based PLMN or an NTN-based PLMN having a priority higher than the connected NTN-based PLMN.

16. The system of claim 15, wherein a priority of the identified NTN-based PLMN is based at least on a signal strength and one or more network services.

17. The system of claim 11, wherein the one or more computer programs further comprise computer-executable instructions that, when executed by the one or more processors, cause the system to:

perform the NTN-based PLMN search having a priority higher than the connected NTN-based PLMN upon determining a lapse of the first timer, and perform the TN-based PLMN search upon determining a lapse of the second timer.

18. The system of claim 11, wherein the one or more computer programs further comprise computer-executable instructions that, when executed by the one or more processors, cause the system to:

identify one or more search parameters based at least on a current location of the UE, and perform the PLMN search based on at least one of the one or more search parameters upon determining that the distance between an initial location and the current location of the UE is greater than a predetermined threshold distance value.

19. The system of claim 18, wherein the one or more search parameters comprises at least one of a set of frequencies, a frequency band, a radio access technology (RAT), or a PLMN identifier.

20. One or more non-transitory computer-readable storage media storing computer-executable instructions that, when executed by one or more processors of a system for power management at a user equipment (UE), cause the system to perform operations, the operations comprising:

establishing, by the UE located at an initial location, a radio resource control (RRC) connection with a non-terrestrial network (NTN)-based public land mobile network (PLMN);

monitoring a first PLMN search timer for performing an NTN-based PLMN search and a second PLMN search timer for performing a terrestrial network (TN)-based PLMN search;

performing a PLMN search for identifying a PLMN with a higher priority than the connected NTN-based PLMN upon determining that the first or the second PLMN search timer has lapsed; and establishing a RRC connection with the PLMN with the higher priority than the connected NTN-based PLMN.

\* \* \* \* \*